(12) United States Patent
Esenlik et al.

(10) Patent No.: US 11,368,696 B2
(45) Date of Patent: Jun. 21, 2022

(54) PICTURE ENCODER, PICTURE DECODER AND CORRESPONDING METHODS OF ENCODING AND DECODING

(71) Applicant: Huawei Technologies Co., Ltd., Shenzhen (CN)

(72) Inventors: Semih Esenlik, Munich (DE); Ivan Krasnov, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/142,957

(22) Filed: Jan. 6, 2021

(65) Prior Publication Data
US 2021/0127115 A1   Apr. 29, 2021

Related U.S. Application Data

(63) Continuation of application No. PCT/EP2018/068408, filed on Jul. 6, 2018.

(51) Int. Cl.
*H04N 11/02* (2006.01)
*H04N 19/132* (2014.01)
(Continued)

(52) U.S. Cl.
CPC ......... *H04N 19/132* (2014.11); *H04N 19/117* (2014.11); *H04N 19/176* (2014.11); *H04N 19/46* (2014.11); *H04N 19/82* (2014.11)

(58) Field of Classification Search
CPC .. H04N 19/132; H04N 19/117; H04N 19/176; H04N 19/46; H04N 19/82
(Continued)

(56) References Cited

U.S. PATENT DOCUMENTS 5,818,970 A * 10/1998 Ishikawa ............ H04N 1/40062
                                                          382/248
8,472,729 B2 * 6/2013 Howard ............... H04N 19/625
                                                          382/232
(Continued)

FOREIGN PATENT DOCUMENTS

CN      102714732 A     10/2012
CN      103493494 A      1/2014
(Continued)

OTHER PUBLICATIONS

Wenger "Parameter set updates using conditional replacement," Joint Collaborative Team on Video Coding (JCT-VC) of ITU-T SG16 WP3 and ISO/IEC JTC1/SC29/WG11, Document: JCTVC-E309, 5th Meeting: Geneva, CH, XP030048404, pp. 1-4 (Mar. 16-23, 2011).

(Continued)

*Primary Examiner* — Jayanti K Patel
*Assistant Examiner* — Richard B Carter
(74) *Attorney, Agent, or Firm* — Leydig, Voit & Mayer, Ltd.

(57) ABSTRACT

The present disclosure relates to adaptive filtering, e.g. adaptive loop filtering, which may be used during encoding and decoding of video pictures. In particular, the present disclosure provides for determining a zero coefficients map, in which each bit indicates whether or not a respective filter coefficient of a supporting region is to be included into the bitstream for an adaptive filter. An indication of the zero coefficients map is included into the bitstream before at least one filter coefficient of the adaptive filter indicated by the zero coefficients map as to be included into the bitstream. The provision of a zero coefficients map enables an efficient signaling and allows for flexible filter shapes that are particularly suitable for the content at hand.

16 Claims, 12 Drawing Sheets

(51) Int. Cl.
*H04N 19/117* (2014.01)
*H04N 19/176* (2014.01)
*H04N 19/46* (2014.01)
*H04N 19/82* (2014.01)

(58) Field of Classification Search
USPC ............ 375/240.02, 240.12, 240.18, 240.25; 382/232, 248
See application file for complete search history.

(56) References Cited

U.S. PATENT DOCUMENTS

| | | | |
|---|---|---|---|
| 2011/0243248 A1* | 10/2011 | Alshin | G06K 9/4604 375/240.25 |
| 2012/0039383 A1 | 2/2012 | Huang et al. | |
| 2013/0215969 A1* | 8/2013 | Fang | H04N 19/136 375/240.18 |
| 2013/0266060 A1 | 10/2013 | Budagavi | |
| 2014/0086319 A1* | 3/2014 | Xu | H04N 19/82 375/240.12 |
| 2017/0324962 A1 | 11/2017 | Karczewicz et al. | |

FOREIGN PATENT DOCUMENTS

| | | |
|---|---|---|
| CN | 104539964 A | 4/2015 |
| EP | 3177014 A1 | 6/2017 |

OTHER PUBLICATIONS

Wiegand et al., "WD2: Working Draft 2 of High-Efficiency Video Coding," Joint Collaborative Team on Video Coding (JCT-VC) of ITU-T SG16 WP3 and ISO/IEC JTC1/SC29/WG11, 4th Meeting: Daegu, KR, Document: JCTVC-D503, Total of 155 pages (Jan. 20-28, 2011).

"Line Transmission of Non-Telephone Signals, Video Codec for Audiovisual Services at p x 64 kbits," ITU-T Recommendation H.261 (Previously "CCITT Recommendation"), ITU-T Telecommunication Standardization Sector of ITU, Total 29 pages, International Telecommunication Union, Geneva, Switzerland (Mar. 1993).

Kang et al., "Description of SDR video coding technology proposal by ETRI and Sejong University," Joint Video Experts Team (JVET) of ITU-T SG 16 WP 3 and ISO/IEC JTC 1/SC 29/WG 11, Document: JVET-J0013-v2 XP030151171, Total 42 pages (Apr. 10-20, 2018).

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, Document: JCTVC-G1103_d9, Total of 239 pages (Nov. 21-30, 2011).

"Series H: Audiovisual and Multimedia Systems, Infrastructure of audiovisual services—Coding of moving video, Information technology—Generic coding of moving pictures and associated audio information: Video: Frame packing arrangement signalling for 3D content, Amendment 4," ITU-T Telecommunication Standardization Sector of ITU, H.262 Amendment 4, Total 238 pages, International Telecommunication Union, Geneva, Switzerland (Feb. 2012).

Sullivan et al., "Overview of the High Efficiency Video Coding (HEVC) Standard," IEEE Transactions on Circuits and Systems for Video Technology, vol. 22, No. 12, pp. 1649-1668, XP055388661, Institute of Electrical and Electronics Engineers, New York, New York (Dec. 2012).

"Series H: Audiovisual and Multimedia Systems, Infrastructure of audiovisual services—Coding of moving video, Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

"Series H: Audiovisual and Multimedia Systems, Coding of moving video, Implementors Guide for H.263: Video coding for low bit rate communication," ITU-T Telecommunication Standardization Sector of ITU, H.263 Implementors' Guide, Total 10 pages, International Telecommunication Union, Geneva, Switzerland (Aug. 5, 2005).

"Series H: Audiovisual and Multimedia Systems, Infrastructure of audiovisual services—Coding of moving video, High efficiency video coding," Recommendation of ITU-T H.265, ITU-T Telecommunication Standardization Sector of ITU, pp. 1-692, International Telecommunication Union, Geneva, Switzerland (Feb. 2018).

Karczewitz et al., "CE5: coefficient coding with LCEC for large blocks," Joint Collaborative Team on Video Coding (JCT-VC) of ITU-T SG16 WP3 and ISO/IEC JTC1/SC29/WG11, 5th Meeting: Geneva, CH, Document: JCTVC-E383, pp. 1-3 (Mar. 16-23, 2011).

CN/201880095449, Office Action/Search Report, dated Feb. 21, 2022.

* cited by examiner

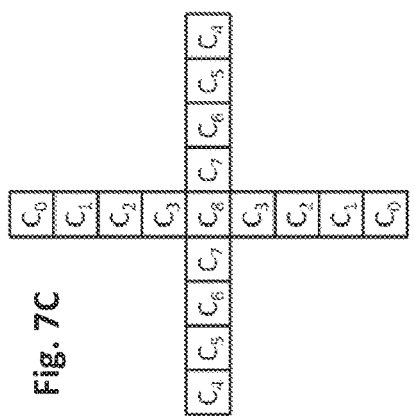
Fig. 7B
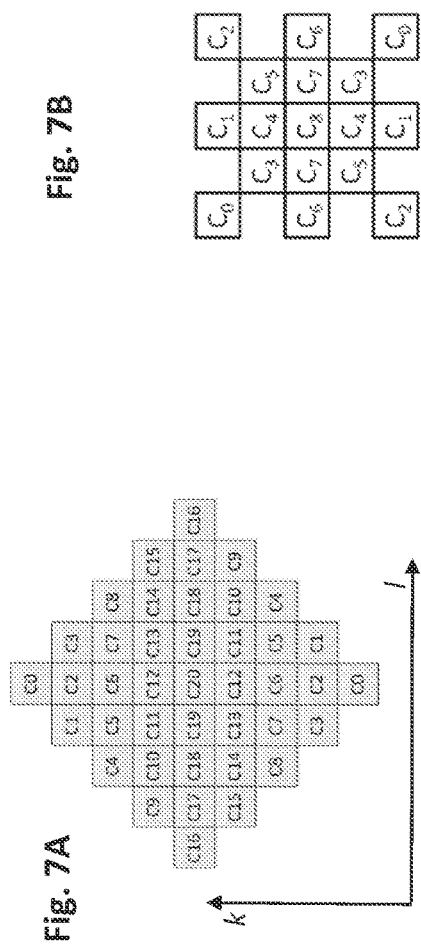
Fig. 7A
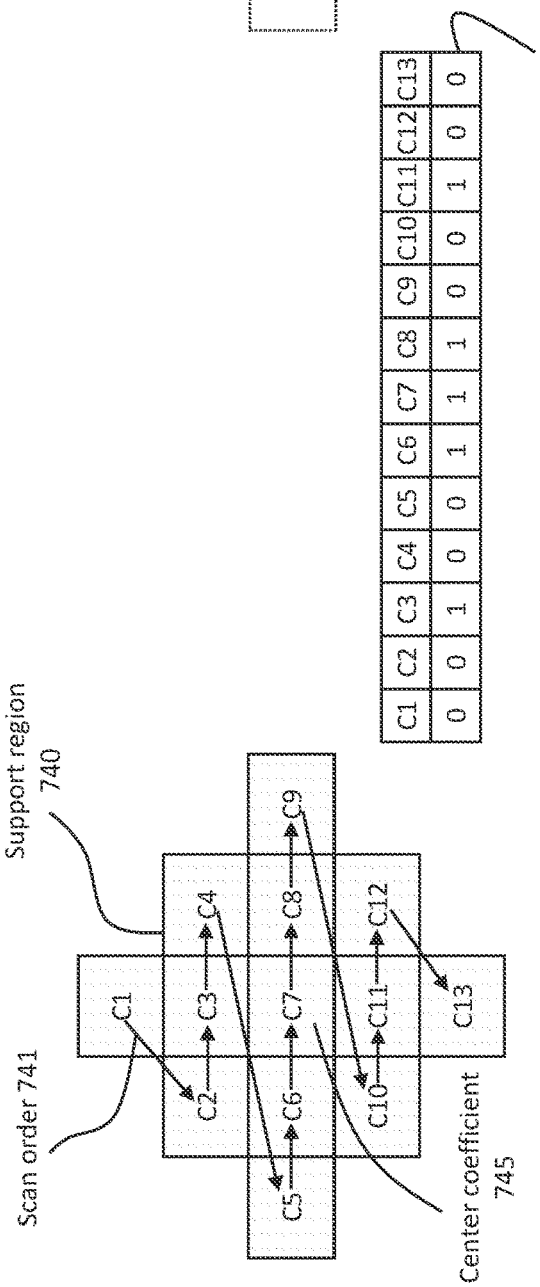
Fig. 7C
Fig. 7D
Fig. 7E
Fig. 7F

Fig. 8A — Sequence of flags 810, signaled into bitstream

| C1 | C2 | C3 | C4 | C5 | C6 | C7 | C8 | C9 | C10 | C11 | C12 | C13 |
|----|----|----|----|----|----|----|----|----|-----|-----|-----|-----|
| 0  | 0  | 1  | 0  | 0  | 1  | 1  | 1  | 0  | 0   | 1   | 0   | 0   |

Fig. 8B — Predefined scan order 820; Signaled into bitstream; N=5 (first five entries)

| C7 | C6 | C3 | C8 | C11 | C5 | C1 | C9 | C13 | C10 | C2 | C4 | C12 |
|----|----|----|----|-----|----|----|----|-----|-----|----|----|-----|

Fig. 8C — Predefined scan orders 831, 832, 833; Selected scan order index signaled into bitstream

|   | | | | | | | | | | | | | |
|---|----|----|----|----|----|----|----|----|----|-----|-----|-----|-----|
| 0 | C1 | C2 | C3 | C4 | C5 | C6 | C7 | C8 | C9 | C10 | C11 | C12 | C13 |
| 1 | C7 | C6 | C3 | C8 | C11 | C5 | C1 | C9 | C13 | C10 | C2 | C4 | C12 |
| 2 | C7 | C8 | C9 | C4 | C12 | C13 | C11 | C1 | C3 | C6 | C2 | C10 | C5 |

Fig. 8D — Zero coefficients maps 841, 842, 843; Selected scan order index signaled into bitstream

| Map index | C1 | C2 | C3 | C4 | C5 | C6 | C7 | C8 | C9 | C10 | C11 | C12 | C13 |
|-----------|----|----|----|----|----|----|----|----|----|-----|-----|-----|-----|
| 0 | 0 | 1 | 0 | 0 | 0 | 0 | 1 | 1 | 0 | 0 | 0 | 1 | 0 |
| 1 | 1 | 0 | 1 | 1 | 0 | 1 | 0 | 0 | 1 | 1 | 0 | 0 | 0 |
| 2 | 0 | 1 | 0 | 1 | 0 | 1 | 0 | 1 | 0 | 1 | 1 | 0 | 0 |

PICTURE ENCODER, PICTURE DECODER AND CORRESPONDING METHODS OF ENCODING AND DECODING

CROSS-REFERENCE TO RELATED APPLICATIONS

This application is a continuation of International Application No. PCT/EP2018/068408, filed on Jul. 6, 2018, the disclosure of which is hereby incorporated by reference in its entirety.

TECHNICAL FIELD

The present disclosure relates to the field of picture processing, for example still picture and/or video picture coding.

BACKGROUND

Video coding (video encoding and decoding) is used in a wide range of digital video applications, for example broadcast digital television (TV), video transmission over internet and mobile networks, real-time conversational applications such as video chat, video conferencing, digital video disc (DVD) and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), and extensions, e.g. scalability and/or three-dimensional (3D) extensions, of these standards.

Filtering and in particular adaptive filtering has been applied in video coding and decoding at different encoding and decoding stages such as pre-filtering, in-loop filtering or post-filtering. Parameters which have influenced the filter design are picture quality, added overhead due to filter adaption, as well as complexity of implementation.

SUMMARY

According to an embodiment, an apparatus is provided for decoding picture samples from a bitstream, the apparatus including or comprising processing circuitry configured to: extract, from the bitstream, an indication of a zero coefficients map; determine, according to the indication, the zero coefficients map including a plurality of bits, wherein each bit indicates whether or not a respective filter coefficient is to be extracted from the bitstream for an adaptive filter; and extract, from the bitstream, at least one filter coefficient indicated by the zero coefficients map as to be extracted from the bitstream.

The provision of the zero coefficients map provides the possibility of a more efficient coding. For example, the zero coefficient map may be used to indicate the actual, for example arbitrary, form of the filter.

For example, if a bit of the plurality of bits indicates that the respective coefficient is to be extracted from the bitstream, the coefficient cannot be zero. Such an approach eliminates the necessity for zero values to be signaled and, in combination with an entropy code (variable length code), may lead to an increased coding efficiency.

In some embodiments, the zero coefficients map is associated with each adaptive filter of a plurality of adaptive filters including the adaptive filter; each bit of the plurality of bits indicates whether or not a respective filter coefficient is to be extracted from the bitstream for each adaptive filter of the plurality of adaptive filters; and the processing circuitry is further configured to: extract, from the bitstream, after the indication of the zero coefficients map, at least one filter coefficient of each adaptive filter associated with the zero coefficients map, the at least one filter coefficient being indicated by the zero coefficients map as to be extracted from the bitstream.

Such filter grouping may further improve the efficiency of coding, as several filters may be defined by a common zero coefficients map so that they have the same shape and only differ by the value of coefficients.

In some embodiments, the processing circuitry is further configured to: extract, from the bitstream, an indication of which adaptive filters are associated with the zero coefficients map.

In an exemplary implementation, the zero coefficients map is one of a plurality of zero coefficients maps, each zero coefficients map of the plurality of zero coefficients maps being associated with one or more adaptive filters, each of said one or more adaptive filters being associated with a single zero coefficients map; and the processing circuitry is further configured to: extract, from the bitstream an indication of a number of zero coefficients maps of the plurality of zero coefficients maps followed by, for each zero coefficients map of the plurality of zero coefficients maps: (i) an indication of the respective zero coefficients map, followed by (ii) at least one filter coefficient of the one or more adaptive filters associated with the respective zero coefficients map, wherein the at least one filter coefficient is indicated by the respective zero coefficients map as to be extracted from the bitstream.

The processing circuitry may be further configured to extract, from the bitstream: (i) an indication of a number of adaptive filters that are associated with any zero coefficients map of the plurality of zero coefficients maps, followed by (ii) for each adaptive filter that is associated with a zero coefficients map of the plurality of zero coefficients maps, an indication of which zero coefficients map is associated with the respective adaptive filter.

For example, the indication of the zero coefficients map comprises, for each bit a corresponding flag.

In some embodiments, the indication of the zero coefficients map comprises a positive integer N indicating that (i) the first N filter coefficients in a sequence indicated by a predefined filter coefficient scan order are to be extracted from the bitstream, and (ii) the remaining filter coefficients in the sequence are not to be extracted from the bitstream.

For instance, the indication of the zero coefficients map further comprises a syntax element indicating which predefined filter coefficient scan order of a plurality of predefined filter coefficient scan orders is the predefined filter coefficient scan order.

The indication of the zero coefficients map may comprise an index indicating which predefined zero coefficients map of a plurality of predefined zero coefficients maps is the zero coefficients map.

In some embodiments, the processing circuitry is further configured to: determine a group of a picture sample, the group comprising all picture samples to be filtered with a same adaptive filter, based on evaluating for the picture sample at least one of:
- a position in a picture frame,
- an activity metric that measures variation in a local sample value,
- a local edge information,
- an intensity value, or
- a number of neighboring samples that are smaller than the sample to be filtered.

In some exemplary implementations, the processing circuitry is further configured to extract, from the bitstream, for a group of picture samples, an indication of the corresponding adaptive filter to be used to filter the picture samples.

The processing circuitry may be further configured to filter a picture sample using the adaptive filter with the at least one filter coefficient extracted from the bitstream.

According to an embodiment, an apparatus is provided for encoding picture samples into a bitstream, the apparatus including or comprising processing circuitry configured to: determine a zero coefficients map including a plurality of bits, wherein each bit indicates whether or not a respective filter coefficient is to be included into the bitstream for an adaptive filter; and include, into the bitstream, an indication of the zero coefficients map followed by at least one filter coefficient of the adaptive filter indicated by the zero coefficients map as to be included into the bitstream.

As mentioned above, with regard to the decoder, in some embodiments, if a bit of the plurality of bits indicates that the respective coefficient is to be included into the bitstream, the coefficient cannot be zero.

For example, the zero coefficients map is associated with each adaptive filter of a plurality of adaptive filters including the adaptive filter; each bit of the plurality of bits indicates whether or not a respective filter coefficient is to be included into the bitstream for each adaptive filter of the plurality of adaptive filters; and the processing circuitry is further configured to include, into the bitstream, after the indication of the zero coefficients map, at least one filter coefficient of each adaptive filter associated with the zero coefficients map, the at least one filter coefficient being indicated by the zero coefficients map as to be included into the bitstream.

The processing circuitry may be further configured to include, into the bitstream, an indication of which adaptive filters are associated with the zero coefficients map.

For example, the zero coefficients map is one of a plurality of zero coefficients maps, each zero coefficients map of the plurality of zero coefficients maps being associated with one or more adaptive filters, each of said one or more adaptive filters being associated with a single zero coefficients map; and the processing circuitry is further configured to determine each zero coefficients map of the plurality of zero coefficients maps; and include, into the bitstream an indication of a number of zero coefficients maps of the plurality of zero coefficients maps followed by, for each zero coefficients map of the plurality of zero coefficients maps: (i) an indication of the respective zero coefficients map, followed by (ii) at least one filter coefficient of the one or more adaptive filters associated with the respective zero coefficients map, wherein the at least one filter coefficient is indicated by the respective zero coefficients map as to be included into the bitstream.

In some embodiments, the processing circuitry is further configured to include into the bitstream: an indication of a number of adaptive filters that are associated with any zero coefficients map of the plurality of zero coefficients maps, followed by for each adaptive filter that is associated with a zero coefficients map of the plurality of zero coefficients maps, an indication of which zero coefficients map and associated with the respective adaptive filter.

For example, the indication of a zero coefficients map comprises, for each bit a corresponding flag, and/or the indication of the zero coefficients map, included into the bitstream, comprises a positive integer N indicating that the first N filter coefficients in a sequence indicated by a predefined filter coefficient scan order are to be included into the bitstream, and the remaining filter coefficients in the sequence are not to be included into the bitstream.

Moreover, in some implementations, the indication of the zero coefficients map, included into the bitstream, further comprises a syntax element indicating which predefined filter coefficient scan order of a plurality of predefined filter coefficient scan orders is the predefined filter coefficient scan order; or the indication of the zero coefficients map, included into the bitstream, comprises an index indicating which predefined zero coefficients map of a plurality of predefined zero coefficients maps is the zero coefficients map.

In some embodiments, the processing circuitry is further configured to determine a group of a picture sample, the group comprising all picture samples to be filtered with a same adaptive filter, based on evaluating for the picture sample at least one of: a position in a picture frame, an activity metric that measures variation in a local sample value, a local edge information, an intensity value, and/or a number of neighboring samples that are smaller than the sample to be filtered.

In some embodiments, the processing circuitry is further configured to include, into the bitstream, for the, an indication of the same adaptive filter to be used to filter all the picture samples in the group.

For example, the processing circuitry is further configured to filter a picture sample using the adaptive filter with the at least one filter coefficient encoded into the bitstream.

According to an embodiment, a method is provided for decoding picture samples from a bitstream, including or comprising the steps of: extracting, from the bitstream, an indication of a zero coefficients map; determining, according to the indication, the zero coefficients map including a plurality of bits, wherein each bit indicates whether or not a respective filter coefficient is to be extracted from the bitstream for an adaptive filter; and extracting, from the bitstream, at least one filter coefficient indicated by the zero coefficients map as to be extracted from the bitstream.

For example, if a bit of the plurality of bits indicates that the respective coefficient is to be extracted from the bitstream, the coefficient cannot be zero.

For instance, the zero coefficients map is associated with each adaptive filter of a plurality of adaptive filters; including the adaptive filter each bit of the plurality of bits indicates whether or not a respective filter coefficient is to be extracted from the bitstream for each adaptive filter of the plurality of adaptive filters; and the method further including the step of extracting, from the bitstream, after the indication of the zero coefficients map, at least one filter coefficient of each adaptive filter associated with the zero coefficients map, the at least one filter coefficient being indicated by the zero coefficients map as to be extracted from the bitstream.

The method may be further including the step of extracting, from the bitstream, an indication of which adaptive filters are associated with the zero coefficients map.

For instance, the zero coefficients map is one of a plurality of zero coefficients maps, each zero coefficients map of the plurality of zero coefficients maps being associated with one or more adaptive filters, each of said one or more adaptive filters being associated with a single zero coefficients map; and the method further including the steps of: extracting, from the bitstream an indication of a number of zero coefficients maps of the plurality of zero coefficients maps followed by, for each zero coefficients map of the plurality of zero coefficients maps: an indication of the respective zero coefficients map, followed by at least one filter coefficient of the one or more adaptive filters associated with the respective zero coefficients map, wherein the at least one filter coefficient is indicated by the respective zero coefficients map as to be extracted from the bitstream.

In some embodiments, the method may further include the step of extracting, from the bitstream: an indication of a number of adaptive filters that are associated with any zero coefficients map of the plurality of zero coefficients maps, followed by for each adaptive filter that is associated with a zero coefficients map of the plurality of zero coefficients maps, an indication of which zero coefficients map is associated with the respective adaptive filter.

For example, the indication of the zero coefficients map comprises, for each bit a corresponding flag. For instance, the indication of the zero coefficients map comprises a positive integer N indicating that the first N filter coefficients in a sequence indicated by a predefined filter coefficient scan order are to be extracted from the bitstream, and the remaining filter coefficients in the sequence are not to be extracted from the bitstream.

In some embodiments, the indication of the zero coefficients map further comprises a syntax element indicating which predefined filter coefficient scan order of a plurality of predefined filter coefficient scan orders is the predefined filter coefficient scan order.

In some embodiments, the indication of the zero coefficients map comprises an index indicating which predefined zero coefficients map of a plurality of predefined zero coefficients maps is the zero coefficients map.

In some embodiments, the method may further include the step of determining a group of a picture sample, the group comprising all picture samples to be filtered with a same adaptive filter, based on evaluating for the picture sample at least one of: a position in a picture frame, an activity metric that measures variation in a local sample value, a local edge information, an intensity value, or a number of neighboring samples that are smaller than the sample to be filtered.

For example, the method further includes the step of extracting, from the bitstream, for a group of picture samples, an indication of the corresponding adaptive filter to be used to filter the picture samples.

The method may further include the step of filtering a picture sample using the adaptive filter with the at least one filter coefficient extracted from the bitstream.

According to an embodiment, a method is provided for encoding picture samples into a bitstream, including the steps of: determining a zero coefficients map including a plurality of bits, wherein each bit indicates whether or not a respective filter coefficient is to be included into the bitstream for an adaptive filter; and including, into the bitstream, an indication of the zero coefficients map followed by at least one filter coefficient of the adaptive filter indicated by the zero coefficients map as to be included into the bitstream.

For example, if a bit of the plurality of bits indicates that the respective coefficient is to be included into the bitstream, the coefficient cannot be zero.

For example, the zero coefficients map is associated with each adaptive filter of a plurality of adaptive filters including the adaptive filter; each bit of the plurality of bits indicates whether or not a respective filter coefficient is to be included into the bitstream for each adaptive filter of the plurality of adaptive filters; and the method further including the step of including, into the bitstream, after the indication of the zero coefficients map, at least one filter coefficient of each adaptive filter associated with the zero coefficients map, the at least one filter coefficient being indicated by the zero coefficients map as to be included into the bitstream.

The method may further include the step of including, into the bitstream, an indication of which adaptive filters are associated with the zero coefficients map.

For example, the zero coefficients map is one of a plurality of zero coefficients maps, each zero coefficients map of the plurality of zero coefficients maps being associated with one or more adaptive filters, each of said one or more adaptive filters being associated with a single zero coefficients map; and the method further including the steps of determining each zero coefficients map of the plurality of zero coefficients maps; and including, into the bitstream an indication of a number of zero coefficients maps of the plurality of zero coefficients maps followed by, for each zero coefficients map of the plurality of zero coefficients maps: an indication of the respective zero coefficients map, followed by at least one filter coefficient of the one or more adaptive filters associated with the respective zero coefficients map, wherein the at least one filter coefficient is indicated by the respective zero coefficients map as to be included into the bitstream.

In some embodiments, the method may further include the step of including, into the bitstream: an indication of a number of adaptive filters that are associated with any zero coefficients map of the plurality of zero coefficients maps, followed by for each adaptive filter that is associated with a zero coefficients map of the plurality of zero coefficients maps, an indication of which zero coefficients map is associated with the respective adaptive filter.

For instance, the indication of a zero coefficients map comprises, for each bit a corresponding flag.

The indication of the zero coefficients map, included into the bitstream, may comprise a positive integer N indicating that the first N filter coefficients in a sequence indicated by a predefined filter coefficient scan order are to be included into the bitstream, and the remaining filter coefficients in the sequence are not to be included into the bitstream.

For example, the indication of the zero coefficients map, included into the bitstream, further comprises a syntax element indicating which predefined filter coefficient scan order of a plurality of predefined filter coefficient scan orders is the predefined filter coefficient scan order. For instance, the indication of the zero coefficients map, included into the bitstream, comprises an index indicating which predefined zero coefficients map of a plurality of predefined zero coefficients maps is the zero coefficients map.

In some embodiments, the method may further include the step of: determining a group of a picture sample, the group comprising all picture samples to be filtered with a same adaptive filter, based on evaluating for the picture sample at least one of: a position in a picture frame, an activity metric that measures variation in a local sample value, a local edge information, an intensity value, or a number of neighboring samples that are smaller than the sample to be filtered.

For example, the method further include the step of including, into the bitstream, for the group, an indication of the same adaptive filter to be used to filter all the picture samples in the group.

For example, the method further includes the step of filtering a picture sample using the adaptive filter with the at least one filter coefficient encoded into the bitstream.

Moreover, a computer-readable medium is provided storing instructions, which, when executed by a processor, cause the computer to perform steps according to any of the above mentioned methods.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIGS. 7A, 7B, and 7C are schematic drawings showing three exemplary filters with predefined filter shapes;

FIG. 7D is a schematic drawing showing an exemplary filter support region;

FIG. 7E is a schematic drawing showing an exemplary zero coefficients map;

FIG. 7F is a schematic drawing showing the resulting filter obtained from applying the exemplary zero coefficients map displayed in FIG. 7E to the support region shown in FIG. 7D;

FIGS. 8A, 8B, 8C, and 8D illustrate four alternatives to signal the zero coefficients map;

Figure 1:
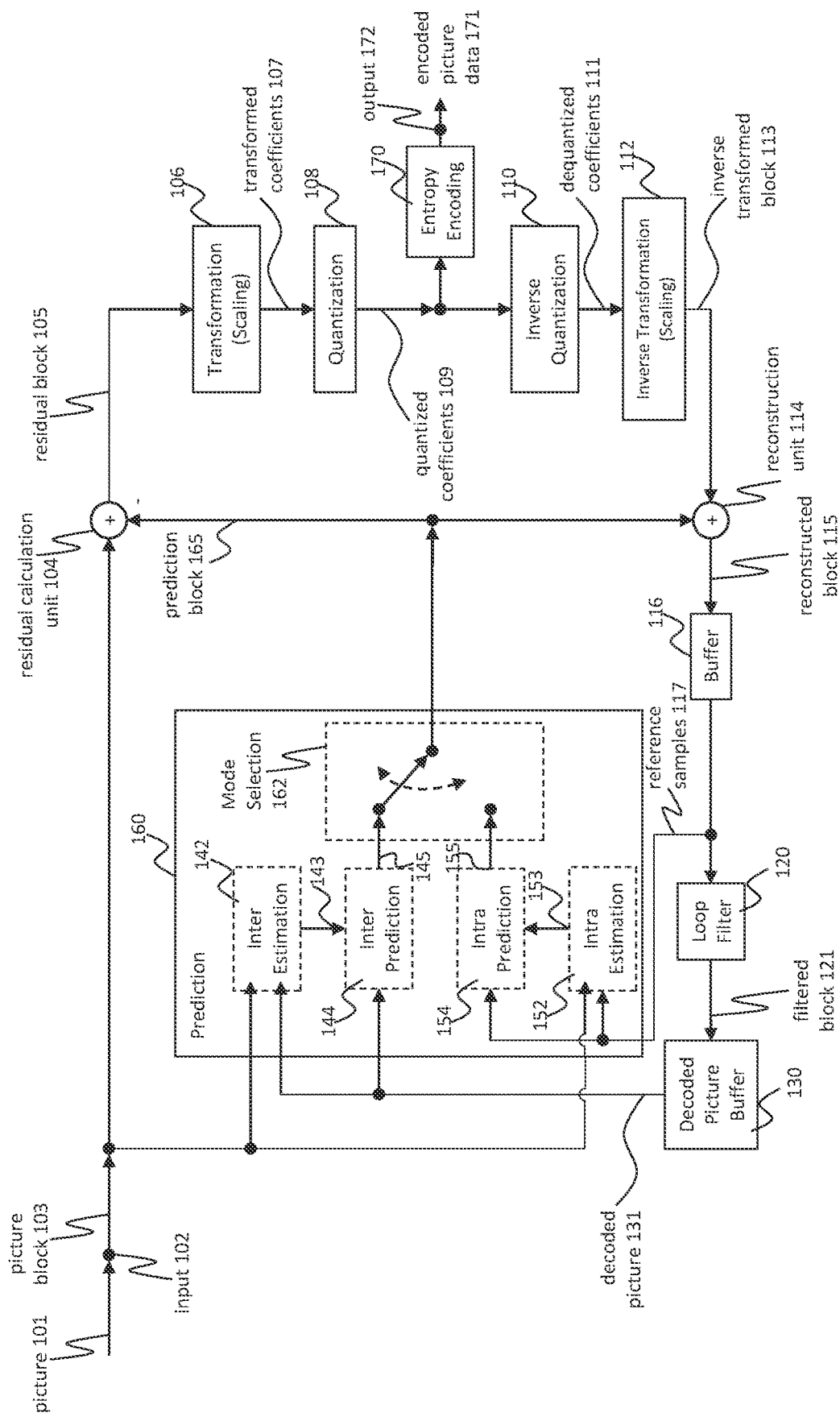
FIG. 1 is a block diagram showing an example of a video encoder.

In the following identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 (before describing embodiments in more detail based on FIGS. 7D to 12).

Figure 3:
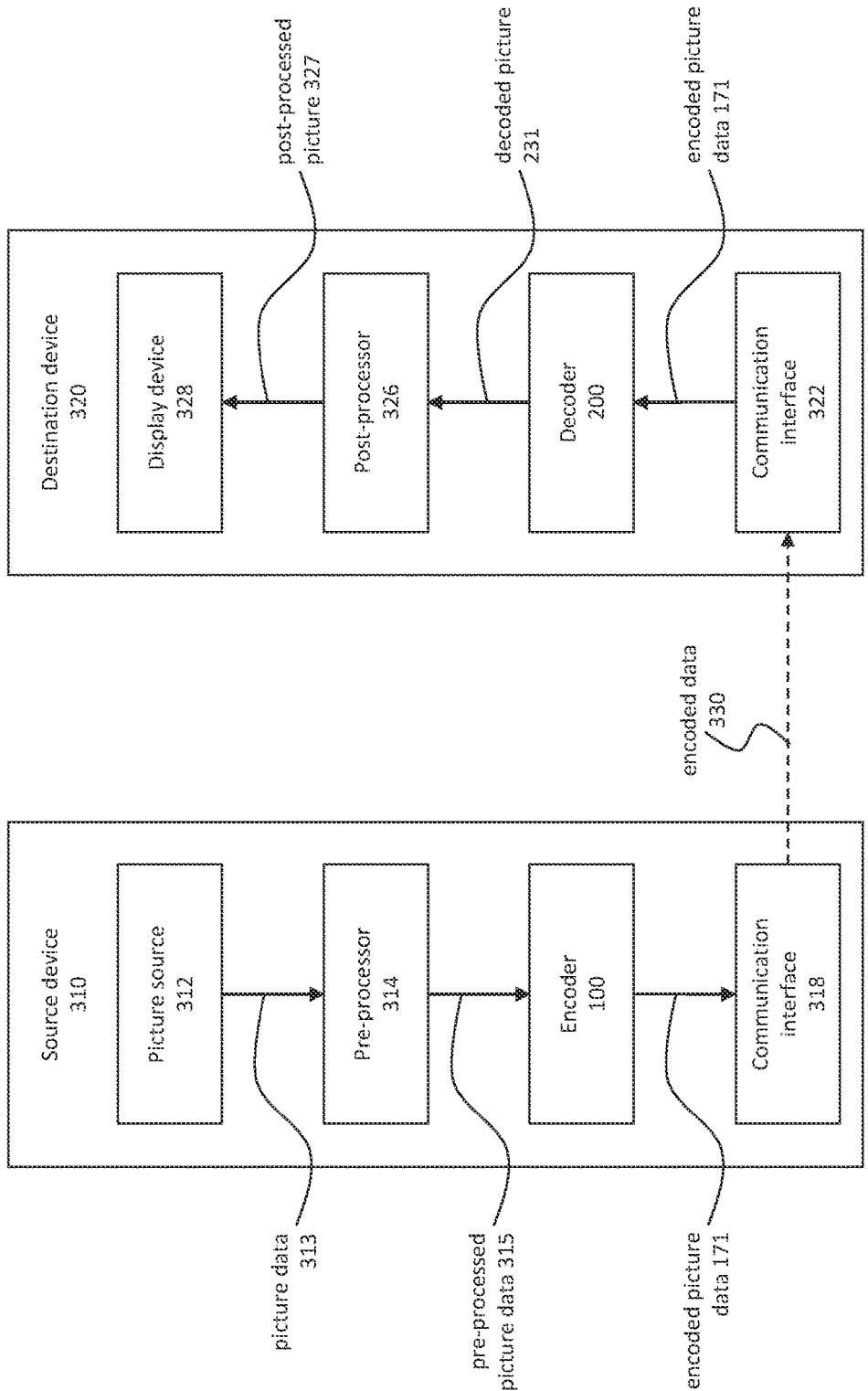
FIG. 3 is a block diagram showing an example of a video coding system.

FIG. 3 is a schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. In some formats, chrominance sample arrays or matrices may be subsampled compared to the luminance arrays or matrices. In particular, for four sample values in a luminance component (luma) picture, there may be only one pixel in each of the two chrominance component pictures (e.g. red and blue chromas). Such subsampled formats are referred to as 4:2:0. Other subsampling patterns are known such as 4:2:2 or the like. The present disclosure is not limited to any specific color representation or resolution.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display, such as beamer, hologram (3D), or the like.

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

For example, the source device 310 and/or destination device 320 may be a smartphone or tablet which may have integrated camera and display. They may further have a wired or wireless interface to capture or display pictures, for instance on a TV set, projector or another displaying device. It is noted that the source and destination device shown in FIG. 3 may be also embodied in one device, in which case reference signs 310 and 320 correspond rather to functional parts of a single device.

However, the present disclosure is not limited to communication devices. Alternatively, or in addition, the source device 310 and/or destination device 320 may be set-top boxes without integrated camera or display, just interface for display via TV set (case of destination device only). Another example deployment of the source device 310 and/or destination device 320 is a TV set with integrated display, typically no camera (another case of destination device only). On the other hand, the source device 310 and/or destination device 320 may be a handheld camera with integrated display (corresponding to source and destination device in one device) or a surveillance camera without integrated display, just interface for transmitting picture (case of source device only). The devices may embody the source device 310 and/or destination device 320, such as smart glasses or 3D glasses (AR/VR). It is noted that one of the embodiments of encoder/decoder may be a chipset (no source device or display device).

Therefore, the source device 310 and the destination device 320 as shown in FIG. 3 are just example embodiments and embodiments of the invention are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like and may use no or any kind of operating system.

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160, an inter estimation unit 142, an inter prediction unit 144, an intra-estimation unit 152, an intra-prediction unit 154, a mode selection unit 162, an entropy encoding unit 170, and an output 172. A video encoder 100 as shown in FIG. 1 may also be referred to as hybrid video encoder or a video encoder according to a hybrid video codec.

Figure 2:
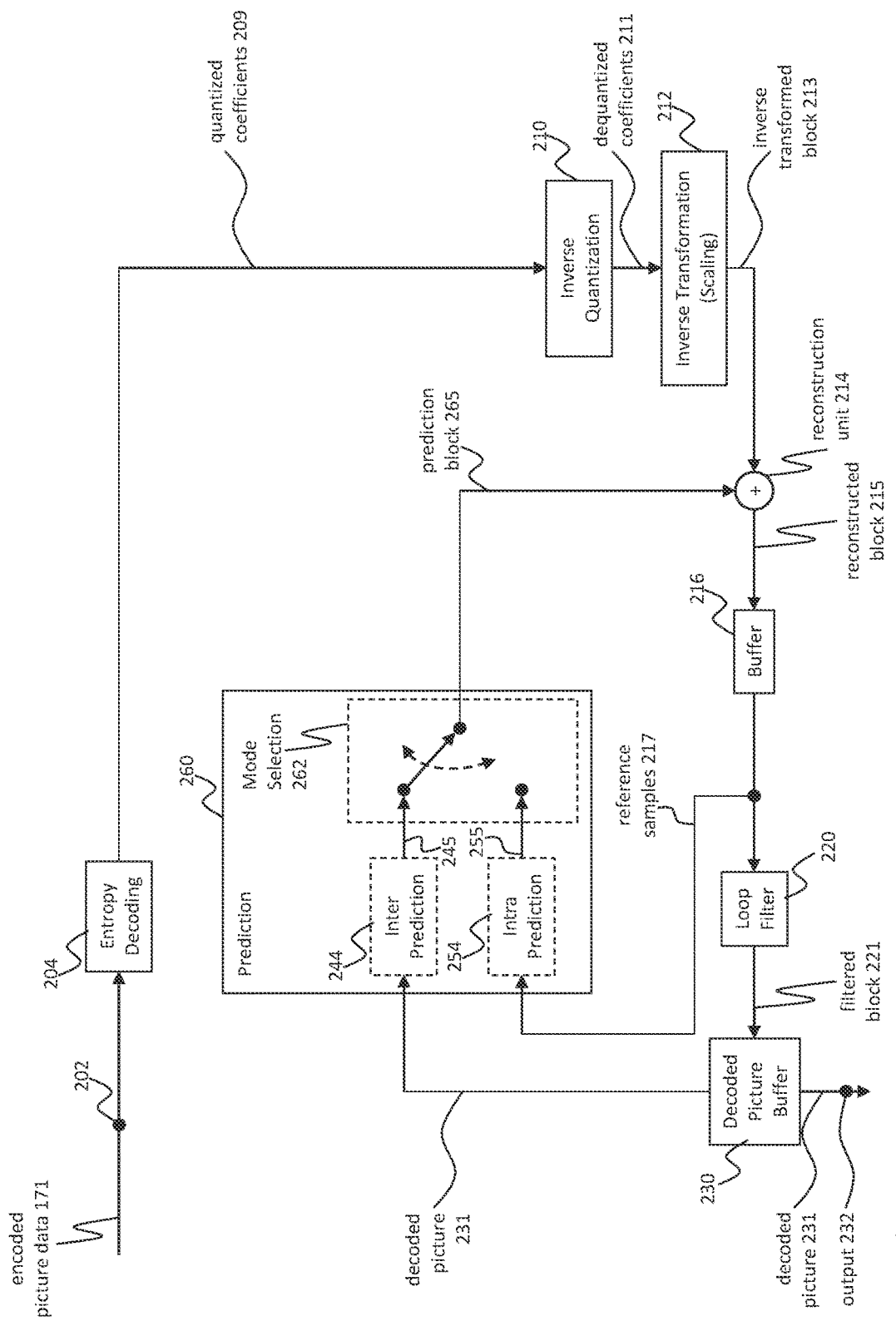
FIG. 2 is a block diagram showing an example structure of a video decoder.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture). It is noted that the encoding (and thus also decoding) order does not necessarily correspond to the displaying order. In particular, if bi-directional prediction is applied, or—in general—prediction using as reference pictures one or more pictures following the current picture the displaying order differs from the processing (coding/decoding) order.

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

For example, in HEVC, the picture is subdivided into so-called coding tree units, CTUs. CTUs have the same size, which may be determined by some signaling parameters or fixed by standard. CTUs typically do not overlap. Each CTU may then be further split into coding and/or transform units, i.e. blocks for which prediction and/or transformation is performed, respectively. The splitting is performed recursively by providing possibility to divide each block further in four further blocks (quad-tree partitioning) or two further blocks (binary-tree partitioning) or any other kind of partitioning. The decision on whether a CTU is split and into which depth for each of the CTU's blocks may be taken by rate-distortion optimization. However, in general, the splitting may also be defined based on other criteria, such as presence of edges in the CTU, or the like. Accordingly, in the present disclosure, when referring to "block" or "unit" as a part of the image, CTU or any units obtained by CTU splitting—square or rectangular without being square—are meant. In general, embodiments are possible, in which the block may overlap.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain. Residual values (forming residual signal) correspond to prediction error (prediction error signal).

The transformation unit 106 is configured to apply a transformation, e.g. a spatial frequency transform or a linear spatial (frequency) transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108?) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking filter, sample-adaptive offset (SAO) filter or other filters, e.g. sharpening or smoothing filters or collaborative filters. The filtered block 121 may also be referred to as filtered reconstructed block 121.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter as will be discussed in detail below.

Embodiments of the loop filter unit 120 may comprise (not shown in FIG. 1) one or a plurality of filters, e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, other modes, e.g. skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation requires/comprises calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

Decoder & Decoding Method

FIG. 2 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 120 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Figure 4:
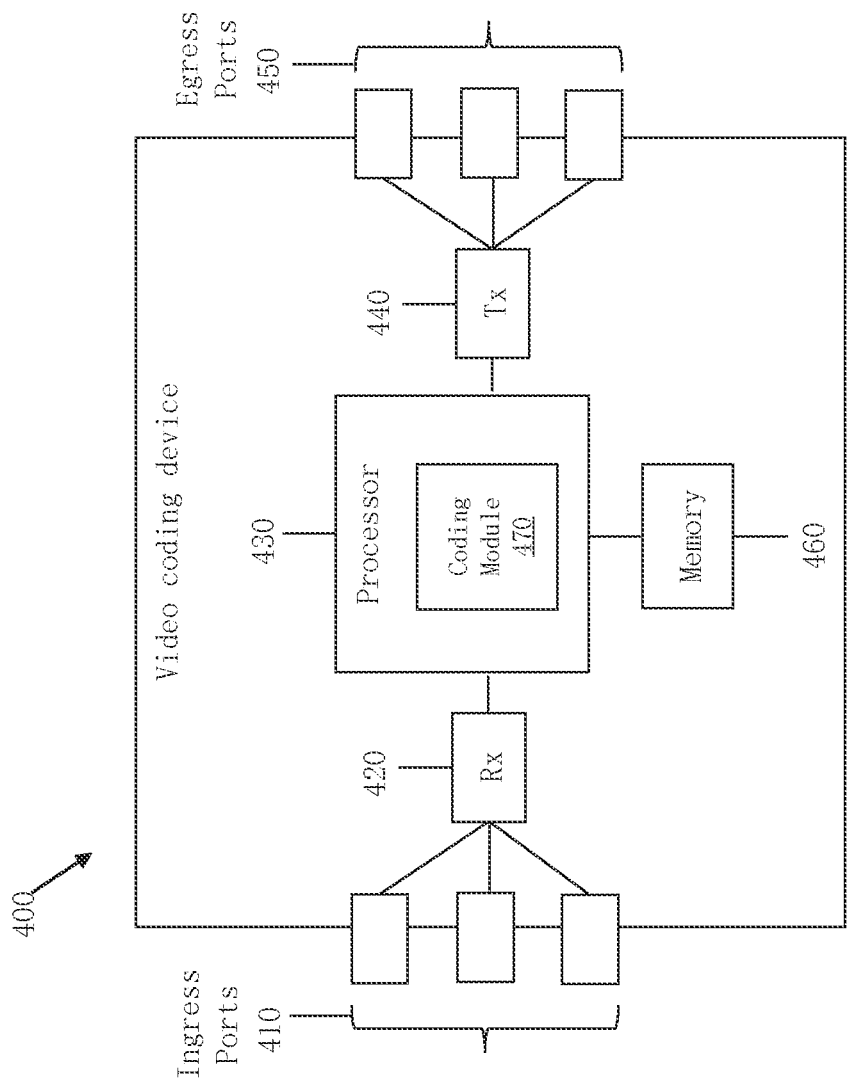
FIG. 4 is a block diagram of a video coder (encoder or decoder) with its interfaces.

FIG. 4 is a schematic diagram of a video coding device 400 according to an embodiment of the disclosure. The video coding device 400 is suitable for implementing the disclosed embodiments as described herein for example as an encoder or decoder. The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals. The video coding device 400 may include any kind of wired or wireless transmitters and/or receivers in some examples.

The processor 430 shown in FIG. 4 is one example of a processing circuitry and may be implemented by hardware and software. The processor 430 may be implemented as one or more CPU chips, cores (e.g., as a multi-core processor), field-programmable gate arrays (FPGAs), application specific integrated circuits (ASICs), and digital signal processors (DSPs). The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static random-access memory (SRAM).

In image processing, filtering of a single sample may be described in terms of the general filtering equation $$R'(i, j) = \sum_{(k,l) \in A} f(k, l) \times R(i+k, j+l)$$

That is, the sample value after filtering R'(i,j) at the coordinate (i,j), is obtained by means of a convolution of the image sample before filtering R(i,j) with the kernel f (convolution kernel, filter kernel, convolution matrix, mask, etc.). The individual entries f(k,l) of the small matrix f are known as filter coefficients.

An example of a filter kernel is depicted in FIG. 7A. In this example, C20 is the center coordinate of the kernel (k=0,l=0), and the filter kernel is symmetric around the center, which may not be true in general.

The summation in the above equation runs over all index pairs (k,l) in A. Here A is a set (collection) of index pairs, and corresponds to the shape of the respective kernel or, equivalently, to the shape of the respective adaptive filter ("filter shape"). For the sake of conciseness, the filter shape corresponding to the set A will be denoted as the filter shape A. Furthermore, a filter coefficient f(k,l) is said to be in "a filter shape A" or "in a support region A" (described hereafter), if (k,l)∈A.

Another important term in the field of image processing is the filter support region (or filtering support region, or just support region), which describes the local region of samples around the sample to be filtered that are used/accessed (or might be used) in the filtering process.

If only a single adaptive filter or multiple adaptive filters with the same filter shape are used, the support region corresponds to the samples necessary for the filter shape of said one or multiple adaptive filters. For instance, if the sample at the position (i,j) is to be filtered and if there is one filter shape A, then the support region consists in the samples R(i+k,j+l), with (k,l)∈A.

If more than one filter with different respective filter shapes is used, then the support region describes the superposition of all of the necessary samples. In an implementation, the filter support region may also correspond to the samples which are stored in a buffer for performing the filtering. For instance, if the sample at the position (i,j) is to be filtered and if there are two filter shapes A and B then the support region consists in the samples R(i+k,j+l), with (k,l)∈A∪B (union).

It is noted that, according to the above definition, the support region is defined as a set of samples R(i+k,j+l) with respect to the center coordinate (i,j). However, as can be seen from the general filtering equation above, for each image sample R(i+k,j+l) in the support region, an adaptive filter may have a corresponding filter coefficient f(k,l), which is the filter coefficient f(k,l) to be multiplied with said image sample R(i+k,j+l) to obtain the filtered image sample R'(i,j). Likewise, for each filter coefficient f(k,l), there is a corresponding image sample R(i+k,j+l) in the support region, which is the image sample multiplied with said filter coefficient f(k,l) to obtain the filtered image sample R'(i,j).

That is, for a support region there is a corresponding region in the coefficient domain, which is the superposition of all filter shapes of adaptive filters used to filter the image samples (the index pairs (k,l) in the above summation that may appear in a filtering process, depending on the adaptive filter used for the respective image sample). In the following, for the sake of simplicity, the term support region will be used for a region in the sample domain or the corresponding region in the coefficient domain.

In the Prior Art, JCTVC-G1103, High Efficiency Video Coding (HEVC) text specification Working Draft 5, section 8.6.3.4, "Filtering process for luma samples", for each image frame 1 flag indicates which of the 2 different filter shapes shown in FIG. 7B and FIG. 7C is to be used for filtering the image. As can be seen, each filter shape has 17 filter coefficients. The filtering support region (superposition of the 2 filters), on the other hand, has 25 filter coefficients. Here the main purpose is to adapt the filter to the image content (e.g. edge directions) in order to improve coding efficiency.

The above operation is in general performed for multiple samples in the image/picture frame, or even for every sample of an image. In other words, convolution between a kernel and an image in the spatial domain is performed. However, the filtering may also be performed in the spatial frequency domain.

Figure 5:
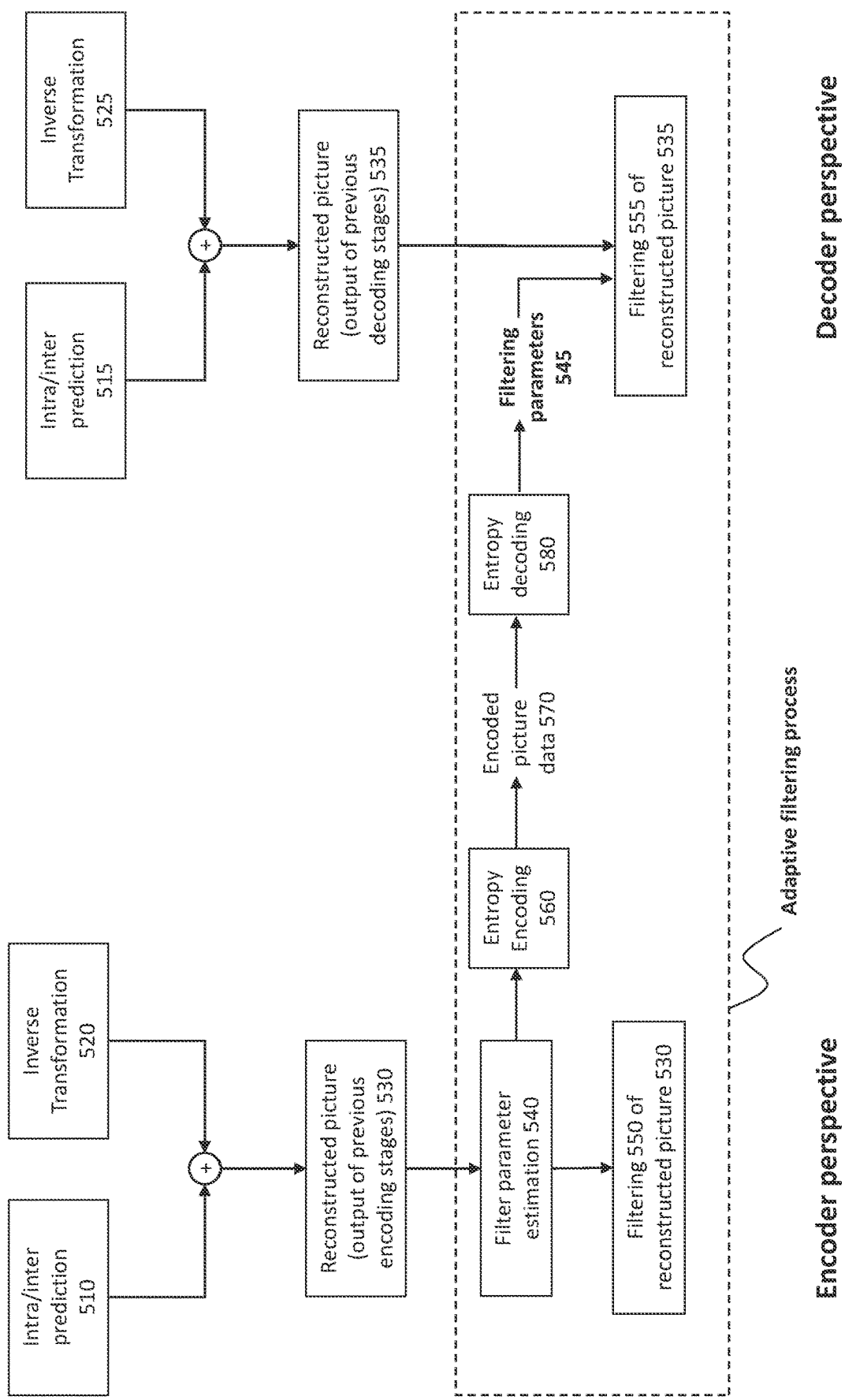
FIG. 5 is a flowchart showing an adaptive filtering process.
Figure 6:
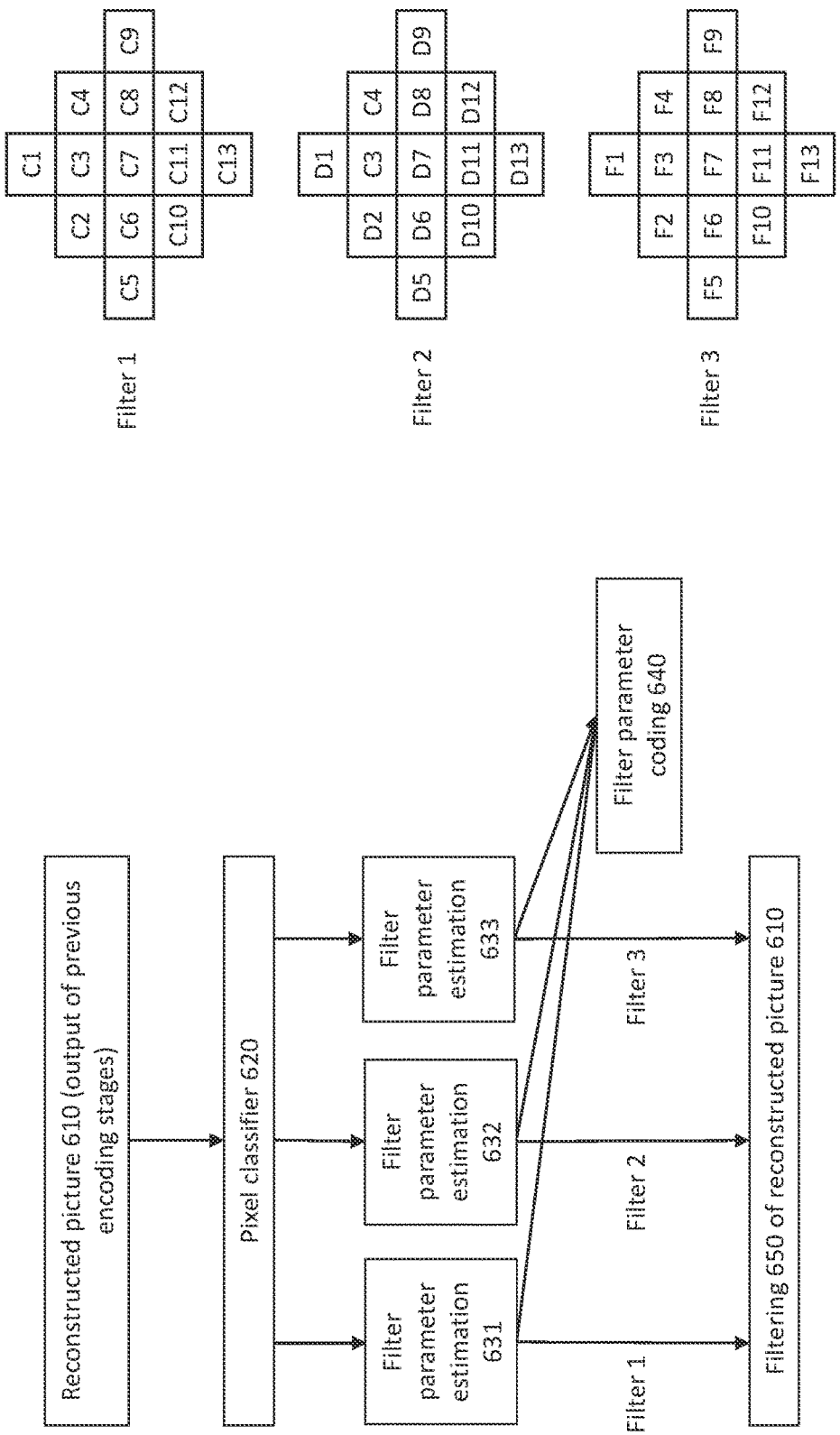
FIG. 6 is a flowchart showing filter parameter signaling for multiple pixel groups.

The present disclosure particularly relates to an adaptive filtering process (filtering using adaptive filters), as illustrated in FIG. 5 and FIG. 6. Here, the term "adaptive" indicates that the filter coefficients to be used in the filtering operation are determined adaptively in the encoder and signaled to the decoder. The adaption may be performed such that the mean square error between original samples and decoded/reconstructed samples is minimized using Wiener-based adaptive filter. However, the present disclosure is not limited thereto and the adaption may be performed in any other way. In general, the filter may be one or two-dimensional with separable or non-separable kernel, linear or non-linear.

In general, for processing of one video sequence, multiple filters with different filter coefficients can be applied to video samples in order to achieve better compression efficiency. This means in the most general sense, 2 samples in a video (located in the same picture or in different picture) can be filtered with 2 different filters.

In the present disclosure, the terms "pixel", "picture sample", "sample", and the like are used interchangeably.

FIG. 6 exemplifies a case in which three different filters are used to filter 650 (e.g. by loop filter 120 or 220) the pixels of the reconstructed picture 610 of the previous encoding stage (e.g. formed by reconstructed blocks 115 or 215). First the pixels/samples of the reconstructed picture 610 are classified into pixel/sample groups by a pixel classifier 620. All pixels/samples in the same group are to be filtered 650 with the same filter. The classification of a pixel/sample for adaptive filtering may depend on one or more of:
- the position in the picture (left-top quadrant, etc.),
- an activity metric that measures variation in local sample value,
- color information channel (luminance channel vs. chrominance channel),
- local edge direction and/or position of the sample with respect to the edge,
- intensity value of the sample,
- sample ranking inside a local window (number of neighboring samples that are smaller than the sample to be filtered), etc.

In general, wherever embodiments and the description refer to the number of bits, filter coefficients, pixels, samples, picture samples, zero coefficients maps, adaptive filters, groups, filter groups, or multiplication/addition operations, the term "number" means "amount", "count", "quantity", "total number" or "overall number" of the objects respectively indicated after the "of". In particular, this number may correspond to a positive integer.

Important steps of the adaptive filtering process in image processing are illustrated in the flowchart shown in FIG. 5. However, most image processing step shown in FIG. 5 have corresponding steps in FIG. 1 and FIG. 2, which have already been explained. An explicit description of these steps is therefore omitted. In particular, the intra/inter prediction step 510 corresponds to the inter prediction step 144, the intra prediction step 154 and the mode selection step 162. Likewise, the intra/inter prediction step 515 corresponds to the inter prediction step 244, the intra prediction step 254 and the mode selection step 262. The inverse transformation 520 and the inverse transformation 525 correspond to the inverse transformation 112 and the inverse transformation 212, respectively. Furthermore, the reconstructed picture 530 and the reconstructed picture 535 correspond to the reconstructed block 115 and the reconstructed block 215, respectively. The entropy encoding 560 and entropy decoding 580 correspond to the entropy encoding 170 and the entropy decoding 204, respectively. The encoded picture data 570 corresponds to the encoded picture data 171. Filtering 550 of reconstructed picture 530 and filtering 555 of reconstructed picture 535 corresponds to the loop filter step 120 and 220, respectively.

Pixels/samples in one picture frame can be classified into a first group, whereas the pixels/samples in second frame can be classified into a second group. In other words, some samples from different pictures may belong to different respective groups. However, since the adjacent pictures of a video sequence are often similar, it may be advantageous to have some samples from different pictures belonging to the same group. On the other hand, one video picture may include regions with different temporal and/or spatial characteristics (e.g. foreground/background or smooth/edges) so that pixels/samples of one video picture may be assigned to different groups.

At the encoder side, the filter coefficients 545 of each filter (or, equivalently, each pixel group) are, after the pixel classification, estimated (step 540 in FIG. 5; step 631, 632, and 633 in FIG. 6) by minimizing the expected value of the error, which is the difference between the sample value O(i,j) of a pixel in the original picture and the sample value R(i,j) of the pixel after filtering 555, 650 the reconstructed picture 610

$$E\left(\left(O(i, j) - \sum_{(k,l) \in A} f(k, l) \times R(i+k, j+l)\right)^2\right)$$

For a set of filter coefficients f(k,l), the expected value of the error may be determined by considering all pixels to be filtered 650 using the same adaptive filter, i.e., all pixels in the same pixel group. The optimization/minimization is then performed with respect to the filter coefficients. In other words, the filter coefficient are determined such that the above expression is minimized. Since this procedure requires the original picture, the filter coefficients have to be entropy encoded 560 and signaled 640 explicitly to the decoder. In particular, the filter kernel, which includes the filter coefficients 545, and the filter support region may be signaled 640 to the decoder, as will be described in more detail below.

Correspondingly, at the decoder side, the filter coefficients 545 of each filter (or, equivalently, each pixel group) are to be parsed from the bitstream.

However, the adaptive filter may be also determined by another optimization approach or cost function such as rate-distortion or rate-distortion-complexity.

An adaptive filter may, for instance, be an Adaptive Loop Filter (ALF), which can be located at the last processing stage for each picture and can be regarded as a tool to catch and fix artifacts from previous stages. That is, if the filtered pictures are used as reference picture for motion compensated prediction by following picture frames, the process is called an adaptive "loop" filter, indicating that the filtering is applied inside the encoding/decoding loop. The term "loop" here refers to the fact that the filtered picture is stored and used as a reference picture for temporal (motion) prediction.

Alternatively, the adaptive filter may be a postfilter or a prefilter. A postfilter is applied to the reconstructed picture but the filtered picture is only displayed rather than further used for encoding or decoding.

There are mainly two problems with filtering. On the one hand the number of multiplication and addition operations in order to filter one sample is rather high. For example, if the filter kernel shown in FIG. 7A is used, then, as can be seen from the general filtering equation shown above, in order to process 1 picture sample, 41 multiplications and 40 additions are necessary. In addition, side information overhead is introduced for signaling 41 filter coefficients.

According to an embodiment, an apparatus is provided for encoding picture samples into a bitstream. The apparatus comprises a processing circuitry which is configured to determine a zero coefficients map including a plurality of bits, wherein each bit indicates whether or not a respective filter coefficient (of the support region) is to be included into the bitstream for an adaptive filter. The processing circuitry is further configured to include, into the bitstream, an indication of the zero coefficients map followed by at least one filter coefficient of the adaptive filter indicated by the zero coefficients map as to be included into the bitstream.

In general, if a bit included in a zero coefficients map indicates that a respective filter coefficient is not to be included into the bitstream for an adaptive filter, the respective filter coefficient is not included in the bitstream.

In general, this may be interpreted in a way that the respective filter coefficient is set to zero. However, according to the general filtering equation $$R'(i,j) = \sum_{(k,l) \in A} f(k,l) \times R(i+k, j+l),$$

a summand corresponding to a filter coefficient that is set to zero $f(k,l)=0$ does not contribute to the filtering. The corresponding index pair $(k,l)$ may therefore be removed from the index set A, without changing the left hand side of the general filtering equation, i.e. without changing the outcome of the filtering process. In other words, a new set $A'=A\setminus(k,l)$, can be established, which contains all the index pairs in the set A except said index pair $(k,l)$, and the new set A' can be considered as defining a new filter shape A'.

Correspondingly, if a zero coefficients map indicates that a filter coefficient is not to be included into the bitstream for an adaptive filter, the filter coefficient may be considered as not being a part of the adaptive filter to be applied to video picture samples. This may enable an efficient implementation in which filter coefficients indicated as not to be included into the bitstream are not input to the filtering operation so that some multiplication and addition operations during the filtering process can be skipped. In other words, this may be interpreted in a way that the zero coefficients map defines a filter shape that does not comprise the filter coefficients that are not included into the bitstream (e.g. they do not belong to an adaptive filter of said filter shape). This does not necessarily mean that a filter coefficient (in the filter shape) of an adaptive filter defined in this way cannot be zero.

In the present disclosure, a bit in a zero coefficients map indicating that a respective coefficient of the filter support region is not to be signaled is the same as saying that the bit indicates that the respective coefficient is to be set to zero (or cannot be nonzero) for an adaptive filter (configured by/using the zero coefficients map) and, correspondingly, is not in the filter shape of the adaptive filter. Note that a coefficient of an adaptive filter that is not in the filter shape of the adaptive filter and set to zero is set to zero in the support region.

However, as can be understood from the above discussion, the present invention is not limited to this. For instance, if a bit in a zero coefficients map indicates that a respective coefficient of the filter support region is not to be signaled, i) the respective filter coefficient may be in the filter shape of the adaptive filter and set to zero or, alternatively, ii) the respective filter coefficient may not be in the filter shape of the adaptive filter and not set to zero.

In general, "signaled" and "included into the bitstream" are used interchangeably.

The apparatus may correspond to encoder module 100 in FIG. 1 discussed above and may be embodied as a chip or as a (part of) a camera, a computer, or any computerized device such as a smartphone, tablet, or any smart device such as smart watch or the like.

General aspects of a zero coefficients map (or zero coefficient map, or bitmap) will now be described referring to the example provided in FIG. 7D to 7F. In particular, FIG. 7D displays the filter support region 740, the center coefficient 745, and the scan order 741; FIG. 7E displays the zero coefficients map 750; and FIG. 7F displays the resulting filter shape 760 shown corresponding to zero coefficients map 750.

In the present example, zero coefficients map 750 is given by the sequence of bits in the lower row. The number of bits is 13, which is the number of coefficients in the support region 740. The upper row of the zero coefficients map 750, which showcases the respective filter coefficient in the support region for each bit, is only displayed for illustrative purposes.

In general, the term "map" in zero coefficients map may merely denote a (one dimensional) sequence of bits. The zero coefficients map may have the number of bits (length) corresponding to the number of filter coefficients in the filter supporting region. The zero coefficients map then indicates (or specifies, e.g. comprises a single indication) for each filter coefficient in the support region, whether the respective filter coefficient is set to zero (and thus, does not need to be included into the bitstream) or to be included into the bitstream for an adaptive filter. Such an adaptive filter, to which the indication included in the zero coefficients map applies (e.g. to which the indications of the corresponding bits whether or not a respective filter coefficient is to be included into the bitstream), will henceforth be denoted as an adaptive filter using the zero coefficients map.

In the present example, the lower row of the table shown in FIG. 7D corresponds to the plurality of bits included in the zero coefficients map 750, each bit indicating whether a respective filter coefficient of the filter support region is to be included into the bitstream or set to zero (in the support region) for an adaptive filter using the zero coefficients map. In this example, a bit being "0" (a zero in the lower row of the zero coefficient zero map 750) means that the corresponding coefficient cannot be nonzero, and a "1" means that the corresponding filter coefficient is to be signaled into the bitstream. Here, signaled or included into the bitstream means that an indication of the value of the filter coefficient is included into the bitstream. Alternative embodiments may use "0" and "1" the other way around.

In general, a bit of the plurality of bits included in a bitmap being zero may indicate that the respective filter coefficient is set to zero for an adaptive filter using the bitmap (the filter coefficient corresponding to the bit), and a bit of the plurality of bits that is one may indicate that the respective filter coefficient is to be included into the bitstream (or vice versa). It is noted that, in the present disclosure, "zero", "is zero", "is set to zero", "must be zero", "is to be set to zero", and similar expressions may be replaced with one another.

In the present example, as mentioned above, the upper row of the zero coefficients map 750 is only displayed for illustrative purposes since it can already be derived from the sequence (order) of bits. Together with the labels "C1, . . . , C13" in FIG. 7D, the upper row determines the association of the individual bits with the filter coefficients of the support region 740, or, in other words, the labels and upper row combined determine which filter coefficients are the respective filter coefficient for the bits in the lower row. It is noted that the scan order 741 (described below) indicated by the labels "C1, . . . , C13" (as well as the arrows), is not part of the support region 740, which is an unordered set of filter coefficients.

Thus, each bit of the zero coefficients map 750 corresponds to a respective filter coefficient in the filter support region 740. That is, as indicated by the "C1" in the upper row of the zero coefficients map directly above the first bit, the first bit of the zero coefficients map corresponds to the filter coefficient of the support region, labeled C1, which is, according to the corresponding label, the filter coefficient two rows above the center coefficient 745 (labeled C7) of the support region 740. Likewise, it can be determined that the third bit of the zero coefficients map corresponds to the filter coefficient, labeled C3, which is the filter coefficient one row above the center coefficient 745.

In this example, the first bit is set to zero, indicating that, for an adaptive filter using this bitmap, the respective filter coefficient of the support region is to be set to zero. The third bit of the zero coefficients map 750, on the other hand, is set to one, indicating that, for an adaptive filter using this bitmap, the respective filter coefficient of the support region is to be included into the bitstream. The other coefficients are treated accordingly.

In general, each bit of the plurality of bits may correspond to (be related to, associated with, assigned to) a single (one) filter coefficients of the filter support region, and each associated filter coefficient of the filter support region may correspond to (be related to, associated with, assigned to) a single (one) bit of the plurality of bits. The number of bits in the plurality of bits included in the zero coefficients map may thus be the number of filter coefficients in the filter support region. That is, the associated filters of a zero coefficients map may be all the filter coefficients in the filter coefficients map. In this case, the (entire) plurality of bits (and thus the bitmap) indicates, for each/all associated filter coefficients of the zero coefficients map, whether it is to be included into the bitstream or set to zero. The association/correspondence between bits and coefficients of the support region may be derived, for instance, from the sequence (order) of bits. That is, the sequence of bits may correspond to the sequence of coefficients (same length) obtained from scanning the filter support region using a scan order. This scan order may, as in the present example, be a predefined scan order. Alternatively, the scan order may be signaled from the encoder to the decoder, or the scan order may be derived implicitly.

In general, a scan order of a support region A takes, as input, all the coefficients f(k,l) that are in the support region A and outputs a sequence (of coefficients) that contains each coefficient f(k,l) that is in the support region A exactly once. That is, one coefficient in the support region is the first coefficient in the sequence obtained from the scan order; and another (not the same) coefficient is the second coefficient in said sequence, and so forth. The length of the sequence corresponds to the number of filter coefficients in the support region.

For example, if in FIG. 7D the filter coefficient f(0,−2) is labeled as "C1" and the filter coefficient f(0,0) is labeled as "C7" (i.e. the center coefficient 745), the scan order 741 of the support region 740 indicated by the labels (as well as the arrows), in FIG. 7D corresponds to the sequence of filter coefficients f(0,−2), f(−1,−1), f(0,−1), f(1,−1), f(−2,0), f(−1, 0), f(0,0), f(1,0), f(2,0), f(−1,1), f(0,1), f(1,1), f(0,2).

In general, a scan order may be used, together with the filter support region, to determine, for each bit of the plurality of bits included in a zero coefficients map, the respective filter coefficient in the support region (to which the indication whether it is to be included into the bitstream or set to zero applies). In other words, the association between bits and filter coefficients of the support region may be determined by a scan order that can be applied to the support region. The scan order(s) to be used for one, some or all zero coefficients maps may be predefined, configurable, or determined by the encoder and indicated in the bitstream.

By applying the entire zero coefficients map 750 to the support region 740 (that is, applying each bit to the respective corresponding coefficient as described above), the filter shape 760 is obtained. In other words, if the relevant support region is the support region 740 and an adaptive filter uses the bitmap 750, five filter coefficients corresponding to the coefficients X1 to X5 in the filter shape 760 are to be signaled/coded into the bitstream for said filter.

In general, the filter shape corresponding to a zero coefficients map may be determined by removing all filter coefficients that are indicated to be set to zero by said zero coefficients map from the support region. In other words, the filter shape of a bitmap contains only the filter coefficients of the support region that are indicated to be included into the bitstream by said bitmap, and, for each adaptive filter using said bit map, only the filter coefficients of the support region that are in the filter shape are included into the bitstream. That is, the filter shape of a bitmap contains exactly the filter coefficients of the support region that are indicated to be included into the bitstream by said bitmap. Advantageously, the filter coefficients that are, according to a zero coefficients map, to be included into the bitstream are included, into the bitstream, after the indication of said zero coefficients map.

The provision of a zero coefficients map may enable an efficient signaling. In particular, an indication of the zero-coefficients map may be further encoded separately from the actual coefficient values. That is, the organization (i.e., order, sequence) of the of the syntax elements related to zero and non-zero coefficients in the bitstream is different from the prior art. Furthermore, the concentric filter shapes are not suitable for some content (such as content with strong edge directionality, where elongated filters are more suitable). Accordingly, the invention allows more precise filter shape selection. The additional side information that needs to be conveyed is negligible with respect to today's video resolutions and bitrates.

The determination of a bitmap may include a determination for each filter coefficient in the support region, whether the respective filter coefficient is set zero or to be included into the bitstream, which corresponds to a determination of a plurality of bits. For example, the shape of the filter may be determined based on the local edge direction. The edge direction could be used to determine the shape/bitmap of an adaptive filter. The filter coefficients in the bitmap could be determined by minimizing the error between original samples and decoded samples.

In general, the zero coefficients map identifies only some (not necessarily all) of the filter coefficients (of the support region) that are zero. That is, the coefficients (of the support region) that according to the bitmap are set to zero cannot be non-zero, whereas a coefficients that is indicated as to be included into the bitstream may, in general, be either zero or non-zero. In other words, the indication of a filter coefficient included into the bitstream may indicates that said filter coefficient is zero. In other words, each bit of the plurality of bits included in a zero coefficients map may indicate whether the corresponding filter coefficient is to be included into the bitstream or set to zero for an adaptive filter using said zero coefficients map (a filter to which the zero coefficients map applies).

However, according to some embodiments, if a bit of the plurality of bits indicates that the respective coefficient is to be included into the bitstream, the coefficient cannot be zero. These embodiments disallow any filter coefficient in the individual adaptive filters to be zero. In other words, the indication of a filter coefficient included into the bitstream must not indicate that said filter coefficient is zero. The zero coefficients map may then be seen as a non-zero coefficients map (or non-zero coefficient map), as it indicates which filter coefficients are non-zero, (i.e., the filter coefficients to be signaled in the bitstream). In other words, in some embodiments, if an adaptive filter uses a zero coefficients map, only the filter coefficients that are set to zero by said zero coefficients map may be zero, and the filter coefficients not set to zero by the zero coefficients map cannot be zero.

The filter coefficients are then coded in such a way that no codeword is assigned for the coefficient value "0" (zero). Consequently, if an adaptive filter uses a specific zero coefficients map, only the filter coefficients (of the support region) that are indicated by the zero coefficient to be set to zero, can take a value of zero. And any filter coefficients indicated by the zero coefficient to be included into the bitstream cannot be zero. In other words, each bit of the plurality of bits included in a zero coefficients map may indicate whether or not the corresponding filter coefficient is to be set to zero for an adaptive filter using said zero coefficients map (a filter to which the zero coefficients map applies). In this case, the filter coefficients of the adaptive filter (e.g. the filter coefficients in filter shape of the adaptive filter) cannot be zero.

Since the zero coefficients map then indicates which (all) coefficients that are zero for an adaptive filter using the zero coefficients map, it is not necessary to signal the filter coefficient value "0". In consequence, the codewords for values other than zero get shorter. This will be illustrated on the basis of Table 1 and Table 2 below which show binarizations that may be used when including filter coefficients into the bitstream.

TABLE 1

Exemplary coding of filter coefficients that can be zero.

| Filter coefficient value | Binary codeword |
|---|---|
| 0 | 1 |
| 1 | 0100 |
| −1 | 0101 |
| 2 | 0110 |
| −2 | 0111 |
| 3 | 00100 |
| −3 | 00101 |

Table 1 shows a binarization of filter coefficient values according to "0th order Exp-Golomb code" in order to exemplify the kth order Exp-Golomb, which may be used to encode filter coefficients that may be zero. In particular, the first bit coded for each coefficient value indicates if the respective value is zero or not.

Such a binarization may be used in embodiments in which the filter coefficients that are indicated as to be included into the bitstream can be zero. In this case, it is not necessary to signal the filter coefficients that are indicated as set to zero by the zero coefficients map using the binarization of "zero" in Table 1 above. Only the filter coefficients that are indicated as to be included into bitstream may use the above binarization. In particular, only the filter coefficients that are indicated as to be included into bitstream and are zero may use the binarization of "zero" in Table 1.

TABLE 2

Exemplary coding of filter coefficients that cannot be zero.

| Filter coefficient value | Binary codeword |
|---|---|
| 1 | 100 |
| −1 | 101 |
| 2 | 110 |
| −2 | 111 |
| 3 | 0100 |
| −3 | 0101 |

Table 2 shows a binarization that may be used in embodiments of the present invention, in which the coefficient values of filter coefficients that are included into the bitstream cannot be zero. Only the filter coefficient of the support region that are indicated as set to zero by the zero coefficients map may be zero for an adaptive filter using the zero coefficients map; and these filter coefficients are not included into the bitstream for the adaptive. Therefore, no codeword is assigned to zero in the binarization of Table 2. Consequently, the codewords for non-zero coefficient values become shorter since the first bit of the prior art codewords, indicating whether the value is zero or not, are not required. In this way, the filter coefficient signaling overhead can be reduced.

For reasons of clarity and conciseness, it is henceforth assumed that the explicitly signaled filter coefficients (the filter coefficients indicated to be included in bitstream by the zero coefficients map) cannot be zero. However, the present invention is not limited to this, and, in general, the filter coefficients included into the bitstream may be zero.

According to some embodiments, the zero coefficients map is associated with each adaptive filter of a plurality of adaptive filters including the adaptive filter; each bit of the plurality of bits indicates whether or not a respective filter coefficient is to be included into the bitstream for each adaptive filter of the plurality of adaptive filters. The processing circuitry is further configured to include, into the bitstream, after the indication of the zero coefficients map, at least one filter coefficient of each adaptive filter associated with the zero coefficients map, the at least one filter coefficient being indicated by the zero coefficients map as to be included into the bitstream.

According to some embodiments, the processing circuitry is further configured to include, into the bitstream, an indication of which adaptive filters are associated with the zero coefficients map.

In general, a zero coefficients map may be used by (i.e., apply to) one or multiple adaptive filters. However, advantageously, each adaptive filter uses only a single (one) zero coefficients map.

In the present disclosure, a plurality of adaptive filters is denoted as the filter group (or just group) of a specific zero coefficients map if:

- All adaptive filters that use said zero coefficients map are comprised in said plurality of adaptive filters (Equivalently, all adaptive filters to which said zero coefficients map applies are comprised in said plurality of adaptive filters).
- All adaptive filters of said plurality of adaptive filters use said zero coefficients map (Equivalently, said zero coefficients map applies to all adaptive filters of said plurality of adaptive filters).

Thus, in the embodiment directly above, the plurality of adaptive filters is the filter group of the zero coefficients map.

In the following a specific example is given referring to FIG. 11. Although FIG. 11 refers to the decoder perspective, general aspects discussed here apply to the encoder perspective as well as the decoder perspective. Furthermore, general aspects discussed here apply to the case in which more than group or bitmap is used or signaled as well.

Figure 11:
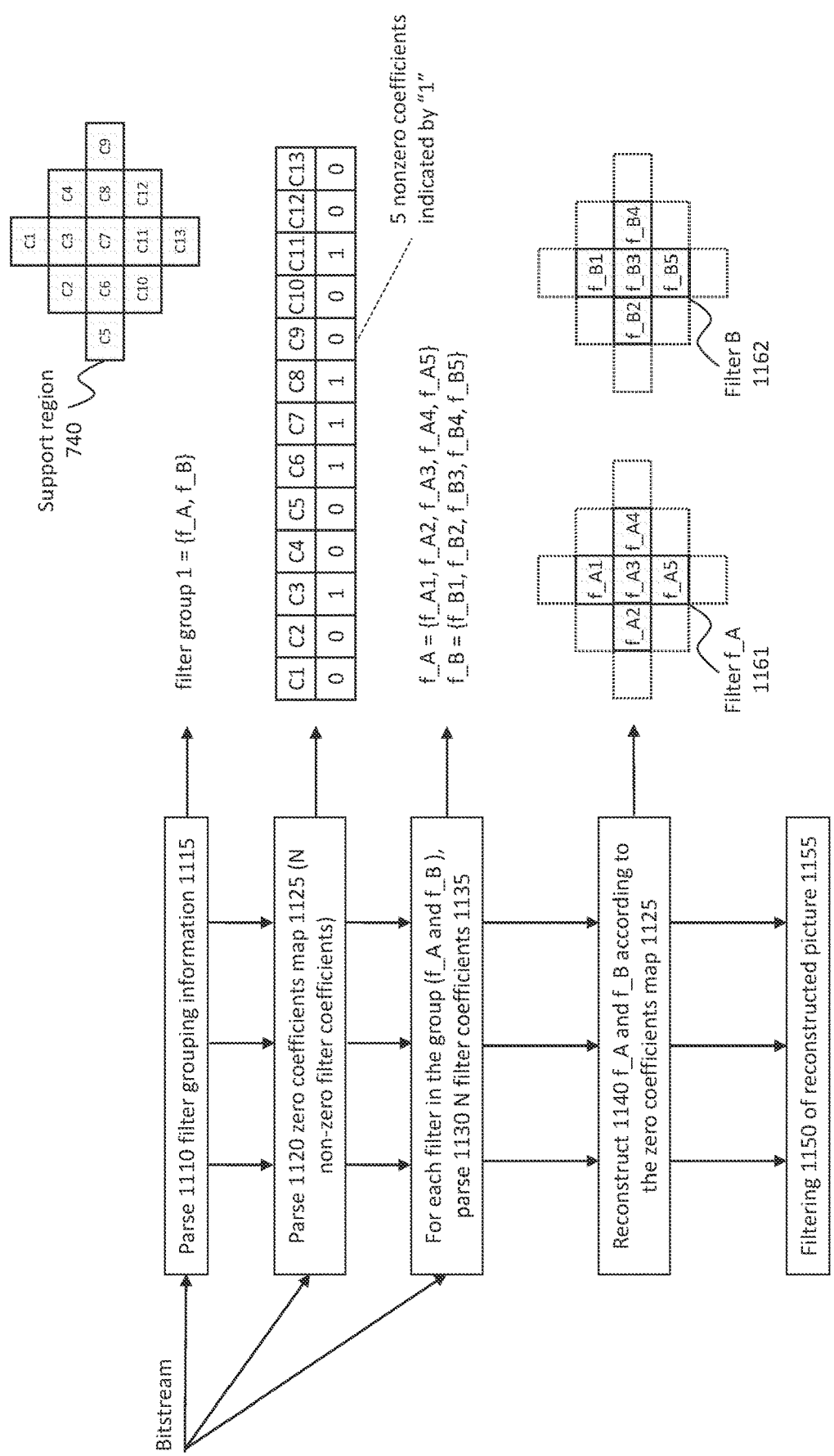
FIG. 11 is a flowchart illustrating two adaptive filters in the same filter group from the decoder perspective.

According to the flowchart shown in FIG. 11, the decoder first parses 1110 the filter grouping information 1115, indicating that there are two filters f_A 1161 and f_B 1162 in filter group 1. In the present example, if it can be inferred by the decoder that there is only one zero coefficients map, the filter grouping information 1115 may just be an indication of the number of adaptive filters (here f_filters=2). It can then be inferred by the decoder that these adaptive filters are associated with the zero coefficients map.

In the present disclosure, the information about which adaptive filters are associated with one or more zero coefficients maps is also denoted as filter grouping information or information about the grouping of adaptive filters. In general, this may be any information that may be used to narrow down or determine the number of adaptive filters in one or more filter groups, the number of adaptive filters associated with a zero coefficients map, or the filter group of a specific adaptive filter. In particular, this may be information about the number of zero coefficients maps, the overall number of adaptive filters, the number of adaptive filters in a particular (single) filter group, or the number of adaptive filters in a filter group subset (e.g. in the union of two or more filter groups). Alternatively, for each (or some) adaptive filter, an individual indication of the zero coefficients map (e.g. a zero coefficients map index) used by the respective adaptive filter may be signaled to indicate the grouping.

In general, when all of the adaptive filters that apply to a picture frame are considered as belonging to a single group (this may be predefined, inferred, configurable, or indicated in the bitstream), it may be inferred that all adaptive filters are associated with the same zero coefficients map. That is, in this case, one zero coefficients map may be signaled per picture frame, and it can be inferred that all adaptive filters are in the filter group of said zero coefficients map. Thus, in order to indicate the relevant filter grouping information, it may be sufficient to signal only the overall number of adaptive filters.

Since, the filter support region 740 is known to the decoder, the decoder can infer that there are 13 bits signaled to indicate the zero coefficients map 1125 of the filter group 1.

It is noted that, in general (see below), a zero coefficients map may be signaled with a different number of bits than the number of adaptive filters in the support region. In general, the number of bits used to signal a zero coefficients map can be derived from the support region.

Having parsed 1120 the zero coefficients map 1125 (i.e. said 13 bits), the decoder may infer that, for each adaptive filter in the corresponding filter group, there may be 5 filter coefficients to be included into the bitstream, namely C3, C6, C7, C8, and C11.

Thus, for each of the filters f_A 1161 and f_B 1162, an encoder may have included 5 coefficients 1135 into the bitstream, and consequently the decoder parses 1130, for each adaptive filter, 5 coefficients 1135 from the bitstream (thus, here, 10 filter coefficients in total). Here, the order in which the 5 coefficients are parsed may correspond to the order of the corresponding bits in the zero coefficients map (C3, C6, C7, C8, and C11).

In general, a zero coefficients map indicates the number of filter coefficients that are to be included (and consequently are to be parsed on the decoder side) for each adaptive filter in its filter group. The order of these filter coefficients in the bitstream may be based on the order of the corresponding bits included in the zero coefficients map.

Assuming that the scan order 741 of the support region 740 indicated in FIG. 11 is known to the decoder, the decoder now has all the information required to reconstruct 1140 the adaptive filters f_A 1161 and f_B 1162 in order to use them by filtering 1150 the reconstructed picture 1155.

As can be seen from FIG. 11, the two resulting filters f_A 1161 and f_B 1162 have the same filter shape (i.e., for the two filters, the same filter coefficients of the support region are zero), which is determined from the bitmap 1125 the support region 740, and the indicated scan order. However, for the two filters f_A 1161 and f_B 1162, different filter coefficients may be included into the bitstream. That, is the filter f_A 1161 has the filter coefficients f_A1, f_A2, f_A3, f_A4, and f_A5, whereas the filter f_B 1162 has the filter coefficients f_B1, f_B2, f_B3, f_B4, and f_B5. Although the filter coefficients of the two filters f_A 1161 and f_B 1162 that correspond to the same filter coefficient in said filter shape or the same filter coefficient in the support region 740 (e.g. f_A1 and f_B1 correspond to the C3, f_A2 and to f_B2 C6, and so forth) may in general be different, not all corresponding filter coefficient have necessarily to be different. Some may be identical (e.g. f_A1=f_B1).

In general, all filters in the same filter group have the same filter shape, which is determined by the corresponding zero coefficients map, the support region and the scan order. Said same filter shape may be determined by removing all filter coefficients that are indicated to be set to zero by said zero coefficients map from the support region. In other words, the filter shape of a bitmap contains only the filter coefficients of the support region that are indicated to be included into the bitstream by said bitmap, and, for each adaptive filter using said bit map, only the filter coefficients of the support region that are in the filter shape are included into the bitstream. That is, the filter shape of a bitmap contains exactly the filter coefficients of the support region that are indicated to be included into the bitstream by said bitmap. Advantageously, the filter coefficients that are, according to a zero coefficients map, to be included into the bitstream are included, into the bitstream, after the indication of said zero coefficients map.

In general, for each adaptive filter an individual indication of the "non-zero" filter coefficients (filter coefficients indicated as to be included into the bitstream by the zero coefficients map) is included into the bitstream. Since this indication may be different for the individual adaptive filters of a same filter group, the individual adaptive filters of the same filter group may have different filter coefficients. In particular the filter coefficients of two different adaptive filters that correspond to the same filter coefficient in said filter shape or the same filter coefficient in the support region may be (but not necessarily are) different.

In general a filter group may contain one or more filters. If there is more than 1 filter in a filter group, then the corresponding zero coefficients map applies to all adaptive filters in the filter group. In other words, the filter coefficients of all adaptive filters in the filter group are set in accordance with the zero coefficients map. This means, firstly, that all adaptive filters in same filter group have the same number "of non-zero" filter coefficients and, in particular, the same filter shape, which is henceforth denoted as the filter shape associated with or corresponding to the group (or zero coefficients map); or the associated or corresponding filter shape. This means, secondly, that all adaptive filters in same filter group have the same number of filter coefficients that are to be included into the bitstream. However, these filter coefficients may have different values of different adaptive filters in the same group. In particular, for each filter coefficient in a filter shape, an indication of the filter coefficient (e.g. the filter coefficient value) that is individual for each adaptive filter in the filter group is included, into the bitstream. This indication indicates the value of the filter coefficient for the respective adaptive filter (and this respective adaptive filter only).

Thus, in general, for each zero coefficients map, the number of filter coefficients included into the bitstream may be "number of adaptive filters in the group of said zero coefficients map" times "number of filter coefficients in the associated shape". The filter coefficients that are signaled for different adaptive filters of the same filter group filter shape may be different or identical. In particular, the filter coefficients of different adaptive filters of the same group that are signaled for the same filter coefficient in the filter shape may be different or identical.

According to some embodiments, the zero coefficients map is one of a plurality of zero coefficients maps, each zero coefficients map of the plurality of zero coefficients maps being associated with one or more adaptive filters, each of said one or more adaptive filters being associated with a single zero coefficients map. The processing circuitry is further configured to determine each zero coefficients map of the plurality of zero coefficients maps; and include, into the bitstream an indication of a number of zero coefficients maps of the plurality of zero coefficients maps followed by, for each zero coefficients map of the plurality of zero coefficients maps:

an indication of the respective zero coefficients map, followed by at least one filter coefficient of the one or more adaptive filters associated with the respective zero coefficients map, wherein the at least one filter coefficient is indicated by the respective zero coefficients map as to be included into the bitstream.

According to some embodiments, the processing circuitry is further configured to include, into the bitstream:

an indication of a number of adaptive filters that are associated with any zero coefficients map of the plurality of zero coefficients maps, followed by for each adaptive filter that is associated with a zero coefficients map of the plurality of zero coefficients maps, an indication of which zero coefficients map is associated with the respective adaptive filter.

In general, a single zero coefficients map may be determined (as well as used, signaled and parsed, etc.) to filter the pixels of one or more image frame. Accordingly, all adaptive filters (e.g., all adaptive filters that apply to a given picture frame) may use the same zero coefficients map, and all adaptive filters may be in a same filter group. Alternatively, multiple zero coefficients maps may be determined. Accordingly, some zero coefficients maps may be used by multiple adaptive filters, while other zero coefficients maps are used by a single adaptive filter. Thus, in some filter groups may be multiple adaptive filters, while in other groups may be only a single adaptive filter. Alternatively, a different zero coefficients map may be determined for each adaptive filter. Accordingly, each adaptive filter may use a different zero coefficients map, and in each filter group may be only a single adaptive filters.

In general, each zero coefficients map applies to (e.g. is used by, is used for, is associated with) all adaptive filters in its filter group, and each filter group may comprise one or more adaptive filters. All adaptive filters in the same filter group are associated with (use) a same single zero coefficients map.

In general, an indication of which zero coefficients map is associated with the respective adaptive filter indicates which of the zero coefficients maps is associated with (e.g. applies to, is used for) the respective adaptive filter.

In general, each zero coefficients map may include a same number of bits, each bit indicating whether or not a respective filter coefficient is to be included into the bitstream for an adaptive filter using the respective zero coefficients map. Said number of bits may correspond to the number of filter coefficients in the support region. A zero coefficients map indicates the filter coefficients of the support region that are zero for all of the adaptive filters in its filter group. Additional "zero" filter coefficients might exist in individual filters of the filter group. In other words, filter coefficients that are in the filter shape of the group may be zero in individual filters. Thus, the adaptive filters in the same filter group have the same filter shape, which is determined by the zero coefficients map. The filter coefficients of an adaptive filter that are in the filter shape are (as indicated by the zero coefficients map as well) included into the bitstream individually for each adaptive filter in the filter group.

Figure 12:
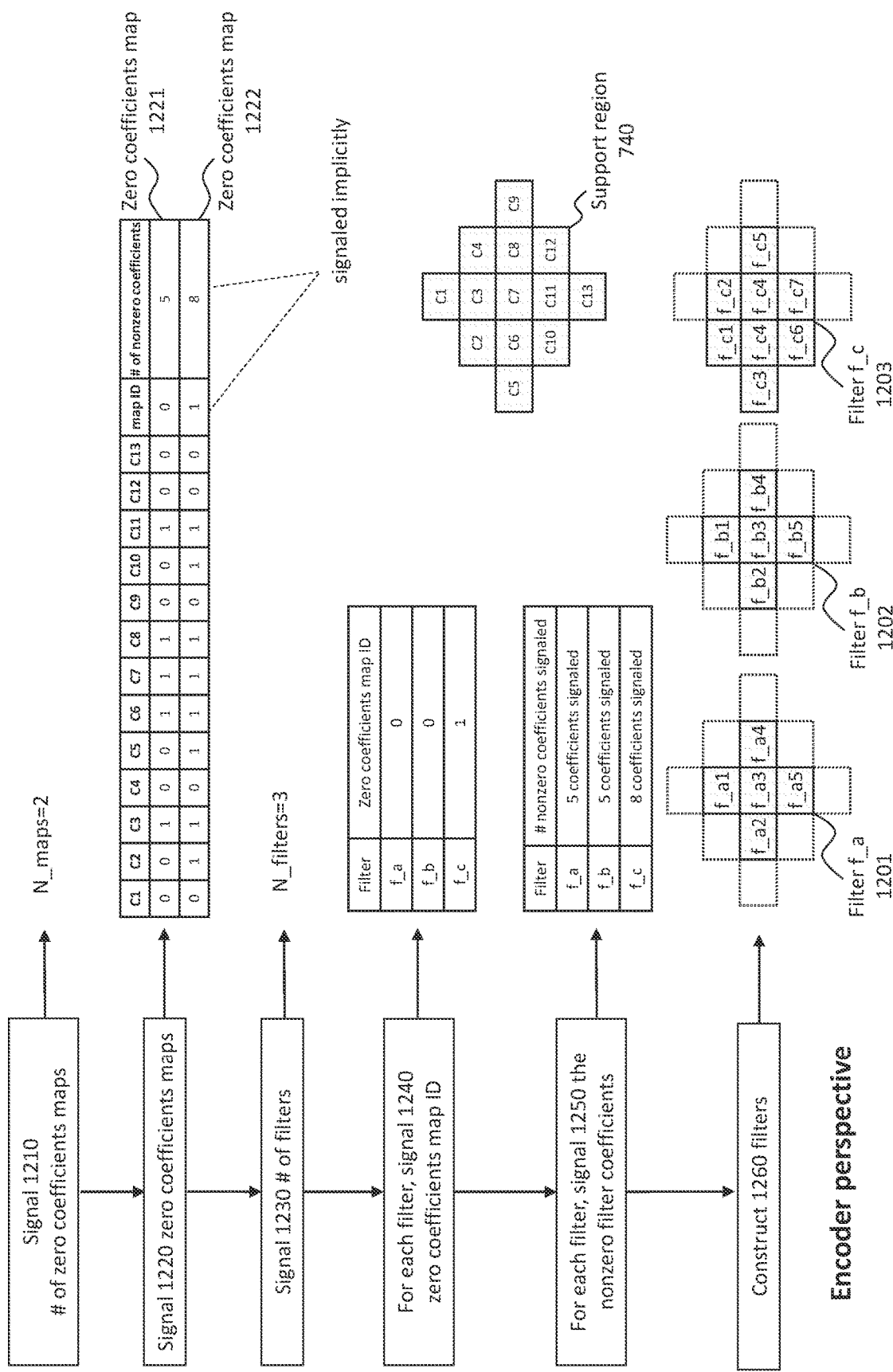
FIG. 12 is a flowchart illustrating three adaptive filters distributed over two filter groups from the decoder perspective.

An exemplary implementation is subsequently given from the encoder perspective on the basis of FIG. 12. As can be seen in FIG. 12, the following steps may be performed by an encoder:

In the present example, firstly the encoder includes 1210, into the bitstream, the number N_maps=2 of different zero coefficients maps used by adaptive filters in order to filter picture samples. Secondly, the encoder includes 1220, into the bitstream, an indication of the zero coefficients map 1221 and an indication of the zero coefficients map 1222.

In general, the encoder may include, into the bitstream, an indication of the number of different zero coefficients maps used by adaptive filters in order to filter picture samples (e.g. of a block, image, picture, frame, etc.). That is, an indication of the number of filter groups may be included into the bitstream. The encoder may further include, into the bitstream, an indication of each said different zero coefficients map. An indication of the zero coefficients map may be a syntax element identifying which of the individual filter coefficients in the filter support region cannot be non-zero. It may be advantageous to include the indication of each bitmap, into the bitstream, after including the indication of the number of bitmaps.

In general, the number of non-zero coefficients of a bitmap as well as the map ID of a bitmap, which are shown in FIG. 12, may be signaled implicitly. Therefore, this information has not to be included into the bitstream. The map ID of a bitmap may be a map index, a number or any syntax element that may be used to identify the bitmap. More specifically, the number of non-zero coefficients can be inferred on the decoder side by counting the number of bits indicating that the respective filter coefficient is to be indicated into the bitstream (In the present example, this yields 5 and 8, for the bitmap 1221 and for the bitmap 1222, respectively.). Furthermore, the map ID of a bitmap may be determined/signaled, for instance, based on the relative position, in the bitstream, of the indication of said bitmap with respect to the indication of the other bitmaps. (In the present example, the bitmap 1221 may be indicated first, which may correspond to the map ID 0, and the bitmap 1221 may be indicated second, which may correspond to the map ID 1).

In the present example, thirdly, the overall number of adaptive filters N_filters=3 (henceforth denoted as f_a, f_b and f_c) is included 1230 into the bitstream; and, fourthly, for each adaptive filter, an indication of the map ID of the bitmap used by the respective adaptive filter is included 1240 into the bitstream.

In general, the number of all adaptive filters (across all filter groups) used to filter picture samples (e.g. of a block, image, picture, frame, etc.) may be included into the bitstream.

In general, the encoder may further include, into the bitstream, for each adaptive filter, an indication of which bitmap is used by (associated with) the respective adaptive filter. This indication may indicate the map ID of the respective bitmap. Alternatively or in addition, this indication may indicate the grouping, in particular, if there are more than one zero coefficients map.

Advantageously, these "map ID" indications may be included, into the bitstream, after including the indication of the number of adaptive filters for this may allow the decoder to determine the number of map IDs to be parsed. Also, advantageously, the "map ID" indications may be included, into the bitstream, after including the indication of the number of bitmaps for this may allow to indicate the map IDs using less bits (e.g. in the present example, the map ID may be indicated using one bit. However, if the information "N_maps=2" is included after the map IDs, and if a priori there may be, for instance, up to 4 bitmaps, the map IDs must be indicated using 2 bits).

In the present example, fifthly, for each adaptive filter the non-zero filter coefficients may be included 1250 into the bitstream. In particular, 5 filter coefficients may be included for the filter f_a, 5 filter coefficients may be included for the filter f_b, and 8 filter coefficients may be included for the filter f_c. Thus, in the present example, in total 18 filter coefficients are to be included into the bitstream. No codeword may be assigned for "0" coefficient value.

In general, for each adaptive filter using a bitmap, the encoder may further include, into the bitstream a number of filter coefficients, the number corresponding to the number of filter coefficients that is indicated, by the respective bitmap, to be included into the bitstream. The order (relative position) in which the individual filter coefficients of each adaptive filter are included into the bitstream may be based on (or related to) the scan order of the support region (e.g. by omitting the filter coefficients set to zero).

Advantageously, a zero coefficients map is included (into the bitstream) before the filter coefficients of the adaptive filters using said zero coefficients map. That is, the zero coefficients map is signaled first, and the filter coefficients of the adaptive filters in the corresponding filter group are signaled thereafter (but not necessarily immediately thereafter). However, the filter coefficients do not necessarily have to follow immediately after the zero coefficients map in the bitstream. Other syntax elements (e.g. another zero coefficients map or filter coefficients of another zero coefficients map) may be inserted between the zero coefficients map and the filter coefficients.

In the present example, sixthly, the adaptive filters f_a 1201, f_b 1202, and f_c 1203 may be constructed. In particular, the zero coefficients maps 1221 and 1211 are applied to the support region 740 using the scan order 741 in the same way as described in detail for FIG. 7 in order to obtain a first and a second filter shape, respectively. In order to obtain the adaptive filter f_a 1201, f_b 1202, and f_c 1203, the filter coefficients of f_a and f_b are inserted into the first filter shape, whereas the filter coefficients of f_c are inserted into the second filter shape.

In general, an adaptive filter using a bitmap may be obtained by inserting the filter coefficients included into the bitstream into the filter shape corresponding to the bitmap, i.e. the adaptive filter may be obtained by using for each filter coefficient in said filter shape the respective corresponding value (filter coefficient), included into the bitstream.

Which filter coefficient of the filter coefficients included into the bitstream for an adaptive filter is to be used for which filter coefficient in said filter shape may be determined based on the order (relative position) of the filter coefficients in the bitstream and/or a scan order of the support region (or a scan order of said filter shape).

Embodiments of the present invention allow for jointly signalling the zero filter coefficients of multiple adaptive filters that are grouped into the same filter group by using a zero coefficients map. In this way, the signaling overhead of signaling zero filter coefficients can be reduced. Furthermore, the number of filter coefficients having zero value is increased (due to more favorable coefficient coding). Hence, the average decoding time is decreased.

According to some embodiments, the indication of a zero coefficients map comprises, for each bit a corresponding flag.

According to some embodiments, the indication of the zero coefficients map, included into the bitstream, comprises a positive integer N indicating that i) the first N filter coefficients in a sequence indicated by a predefined filter coefficient scan order are to be included into the bitstream, and ii) the remaining filter coefficients in the sequence are set to zero (in the support region).

Additionally, according to some embodiments, the indication of the zero coefficients map, included into the bitstream, further comprises a syntax element indicating which predefined filter coefficient scan order of a plurality of predefined filter coefficient scan orders is the predefined filter coefficient scan order.

According to some embodiments, the indication of the zero coefficients map, included into the bitstream, comprises an index indicating which predefined zero coefficients map of a plurality of predefined zero coefficients maps is the zero coefficients map.

In the following, for each of the four above-mentioned possibilities to signal a zero coefficients map, an explicit implementation discussed referring to the explicit examples of FIG. 8A to 8D. In all examples, the considered filter support region is the support region 740, the zero coefficients map to be signaled is the zero coefficients map 750 and, consequently, the resulting filter shape is the filter shape 760.

According to the example shown in FIG. 8A, for each filter coefficient in the filter support region 740 one flag which indicates whether that coefficient is set to zero for the filters using the zero coefficients map 750 or the coefficients may be signaled. This sequence of flags 810 (or bits) corresponds to the lower row in the table of FIG. 8A. In other words, for each bit in the plurality of bits included in the zero coefficients map 750, a corresponding bit is signaled. In this example, the scan order 741 indicated in FIG. 7D is used.

In general, an indication of a zero coefficients map, included into the bitstream, may comprise an indication of one flag for each filter coefficient in the filter support region. Each such flag may correspond to a bit of the plurality of bits included in the zero coefficients map and may indicate whether a respective filter coefficients of an adaptive filter using the zero coefficients map is set to zero or an indication is to be included into the bitstream. In particular, the bits of the plurality of bits included in the zero coefficients map may be included into the bitstream to indicate the bitmap (e.g. the bits may correspond to the flags, and vice versa).

According to the example shown in FIG. 8B, the predefined filter coefficient scan order 820, in which the filter coefficients closer to the center are ordered before the ones farther away, is used. That is, the predefined filter coefficient scan order 820 (as well as the predefined filter coefficient scan orders 831, 832, and 833 in FIG. 8C) refer to the labels in FIG. 7D. In particular, according to the scan order 820, the filter coefficient of the support region 740 labelled as "C7" in FIG. 7D is scanned first, and the coefficient labelled "C6" is scanned second, and so forth. Thus the scan order 820 corresponds to the sequence "C7", "C6", "C3", . . . instead of the "default" sequence "C1", "C2", "C3", which corresponds to the scan order 741.

In the present example, the zero coefficients map 750 may then be signaled by indicating that the first 5 filter coefficients are non-zero, and the remaining filter coefficients are all zero. Thus, for instance, the zero coefficients map 750 may be indicated by including an indication of the number N=5 into the bitstream.

In general, a number N (or syntax element indicating N) may be signaled to indicate that the first N filter coefficients are non-zero, and the remaining filter coefficients are all zero (in the support region). Here the first N filter coefficients are the first N filter coefficients when scanning the support region using the given scan order.

According to the example shown in FIG. 8C, multiple predefined filter coefficient scan orders are defined, i.e. predefined scan order 831, predefined scan order 832, and predefined scan order 833. It is noted that the respective first column of FIG. 8C indicates the scan order index of the respective predefined scan order and is not a part of the said respective predefined scan order (predefined scan order 831, 832, and 833 have scan order index "0", "1", and "2", respectively).

In this example, first a syntax element indicating that the predefined scan order 832 is to be used is included into the bitstream (e.g. by indicating the map index "1"). Afterwards, the N=5 is signaled indicating that the first 5 filter coefficients (in the previously indicated scan order) are non-zero. Applying the indicated predefined scan order 832 to the support region 740, and setting all but the first 5 filter coefficients (thus obtained) to zero (in the support region) yields the filter shape 760 which directly corresponds to the zero coefficients map 750.

In general, multiple predefined filter coefficient scan orders may be used. In this case, a first syntax element may indicate which filter coefficient scan order is to be used to determine a sequence of filter coefficients from the support region; and a second syntax element may indicate the number N of filter coefficients that is to be included into the bitstream. Said N filter coefficients to be included into the bitstream may be the first N filter coefficients in the sequence of filter coefficients obtained by applying the scan order, indicated by the first syntax element, to the support region. Alternatively, the second syntax element may indicate the number of filter coefficients (of the support region) that is set to zero for all adaptive filter in the filter group of this zero coefficients map. The first syntax element may be included into the bitstream before the second syntax element or vice versa. Other syntax element may be inserted between the first and second syntax element.

In general, which particular N coefficients are set to zero or to be included into the bitstream may be determined in accordance with the indicated scan order. For instance, when the second syntax element is a number N indicating that an indication of N filter coefficients is to be included into the bitstream, it may be determined that an indication of the first N filter coefficients, when scanning the support region using the indicated scan order, is to be included into the bitstream, and the remaining filter coefficients are all zero.

According to the example shown in FIG. 8D, there is a predefined table of predefined zero coefficients maps including the zero coefficients maps 841, 842, and 843. It is noted that the respective first column of FIG. 8D indicates the map index of the respective zero coefficients map and is not a part of the said zero coefficients map (Zero coefficients map 841, 842, and 843 have map index "0", "1", and "2", respectively.). The zero coefficient 750 may then be signaled by indicating the map index "0" of the zero coefficients map 841.

In general, there may be multiple predefined zero coefficients maps. In order to signal the zero coefficients map of a filter group, a syntax element indicating one of the predefined zero coefficients maps may be used. For instance, each of the predefined zero coefficients maps may be associated with an index or codeword, which may be indicated by said syntax element.

According to some embodiments, the processing circuitry is further configured to determine a group of a picture sample, the group comprising all picture samples to be filtered with the same adaptive filter, based on evaluating for the picture sample at least one of:
- a position in a picture frame,
- an activity metric that measures variation in a local sample value,
- a local edge information,
- an intensity value, or
- a number of neighboring samples that are smaller than the sample to be filtered.

In general, not all pixels (picture samples) in an image frame are necessarily filtered. All pixels in an image frame are classified into groups ("pixel group"). If the pixels in a group are filtered, all pixels in said group are to be filtered with the same adaptive filter. Consequently, each pixel group has a corresponding adaptive filter and a corresponding zero coefficients map. The filter coefficients of the adaptive filters and zero coefficients maps may be determined after the pixels are classified.

The classification of a pixel in a picture frame may depend one or any combination of the following criteria: i) The position of the pixel in the picture frame; ii) an activity metric that measures the variation in a region around the pixel (e.g. a local variance measure with a defined window size); iii) an edge information in a region around the pixel; iv) an intensity value of the pixel (e.g. the value of the picture sample); and v) the number of pixels in a region around the pixel that have a smaller intensity value than the sample.

According to some embodiments, the processing circuitry is further configured to include, into the bitstream, for the group, an indication of the corresponding adaptive filter to be used to filter the picture samples in the group.

According to some embodiments, the processing circuitry is further configured to filter a picture sample using the adaptive filter with the at least one filter coefficient encoded into the bitstream.

In general, if an adaptive filter uses a zero coefficients map, the filter coefficients of the adaptive filter that are indicated by the zero coefficients map to be set to zero are set to zero in the filter support region. For the remaining filter coefficients of the adaptive filter (which are the filter coefficients for which the zero coefficients map indicates that the filter coefficient is to be included into the bitstream), the respective corresponding filter coefficient (e.g. the value) included into the bitstream for this adaptive filter and for this filter coefficient is used. All of this applies to the encoder as well as the decoder side.

In general, the adaptive filter may then be used to filter a picture sample. In particular, as described above, the corresponding filtered picture sample may be obtained from the general filtering equation by inserting therein the coefficient values of the adaptive filter as well as the corresponding pixel values.

Embodiments, for example, provide an apparatus for decoding picture samples from a bitstream, the apparatus including processing circuitry configured to extract, from the bitstream, an indication of a zero coefficients map; determine, according to the indication, the zero coefficients map including a plurality of bits, wherein each bit indicates whether or not a respective filter coefficient is to be extracted from the bitstream for an adaptive filter; and extract, from the bitstream, at least one filter coefficient indicated by the zero coefficients map as to be extracted from the bitstream.

Figure 9:
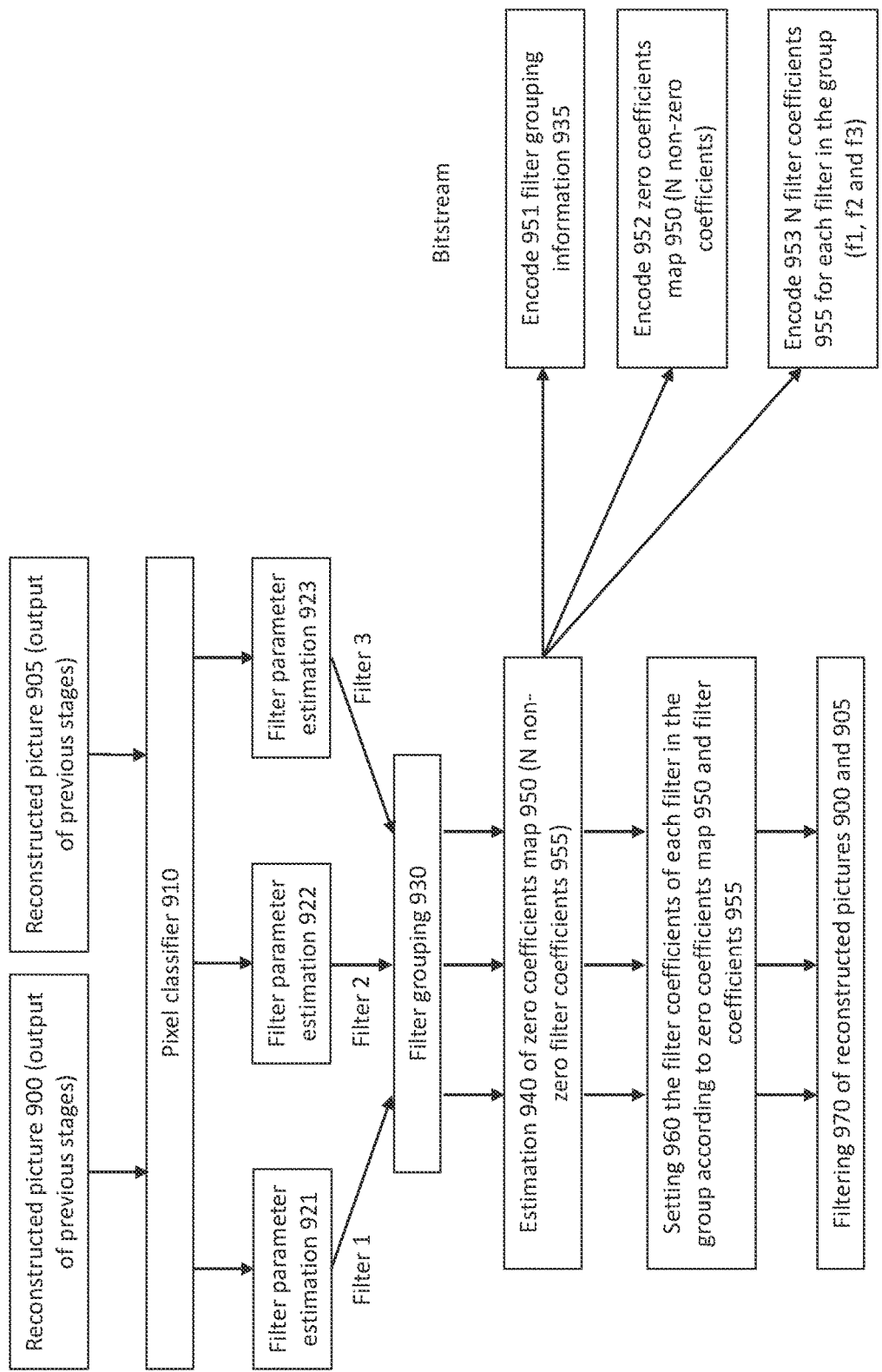
FIG. 9 is a flowchart showing a grouping of filters from the encoder perspective.
Figure 10:
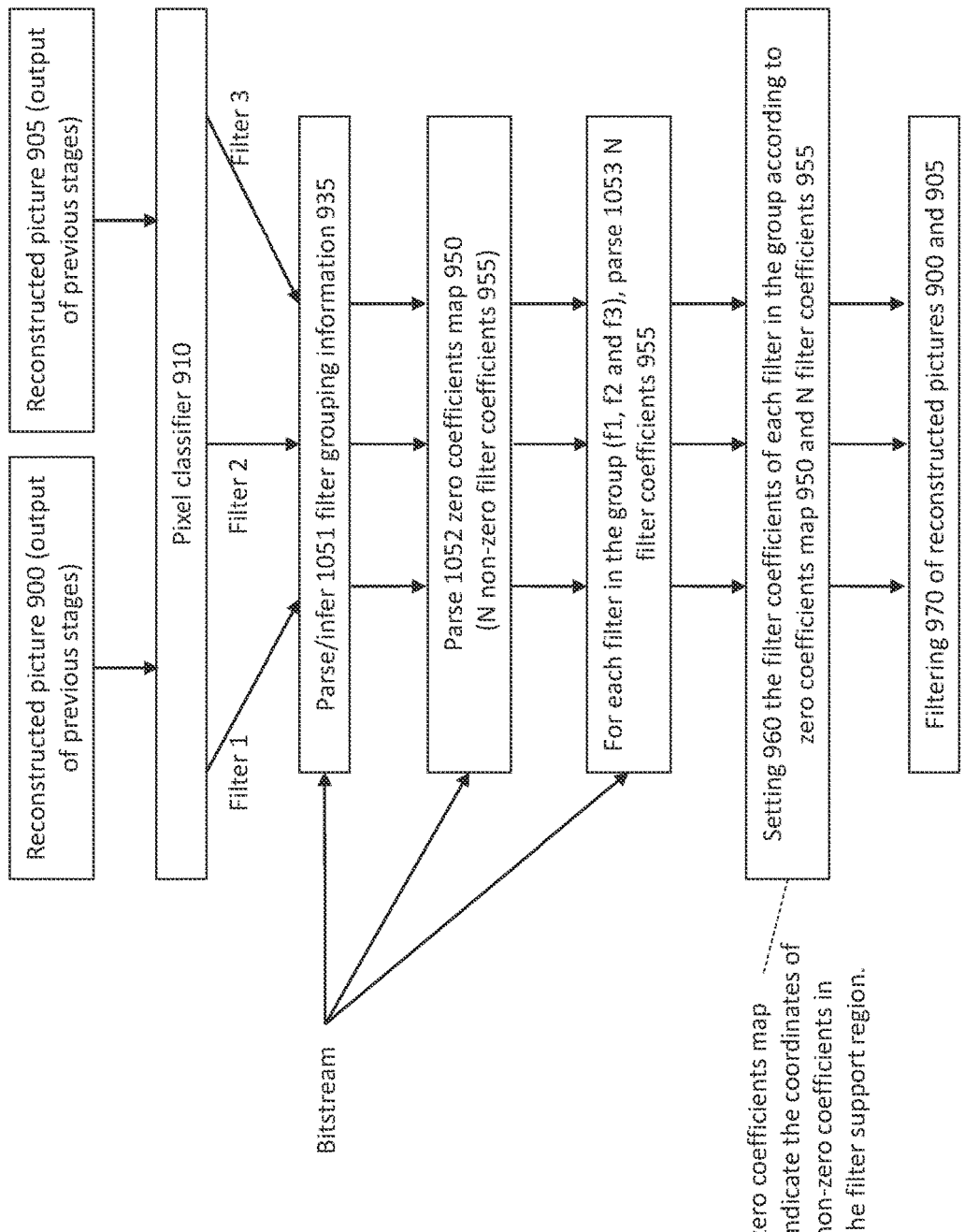
FIG. 10 is a flowchart showing a grouping of filters from the decoder perspective.

The corresponding methods will be now described with reference to FIGS. 9 and 10, which show an exemplary flowchart of filter grouping from the encoder and decoder perspective, respectively. On the encoder side (FIG. 9), the following steps are performed:

First, the pixel classifier 910 classifies, as described above, the pixels in the reconstructed picture 900 and the reconstructed picture 905. In the present example, the pixels are classified into three pixel groups (or groups), and, accordingly, three different adaptive filters will be used to filter the reconstructed picture 900 and the reconstructed picture 905.

Next, the filter parameters (e.g. zero and non-zero filter coefficients in the support region) of the adaptive filter to be used to filter the pixels in the reconstructed picture 900 and the reconstructed picture 905 are estimated. In the present example, there are three adaptive filters, the filter coefficients of which are estimated in the respective steps 921, 922, and 923.

Generally, the filter coefficients may, for instance, be generated by an adaptive wiener filter (e.g. by minimizing the expected value of some function as described above).

Using the result of the filter parameter estimation, the adaptive filters are grouped, i.e. the filter grouping 930 of the three adaptive filters is determined. In the present example, it is determined that the three adaptive filters are in the same group.

In general, one or more groups may be determined. For example, all adaptive filters that have the same filter shape may be grouped into one group.

Next, the zero coefficients map 950 is determined/estimated/generated 940. In the present example, there are N non-zero filter coefficients 955 (for each adaptive filter), which are determined as well.

It is noted that, in general, the pixel classification, the filter grouping, the determination of the zero coefficients maps, and the determination of the individual filter coefficients may be adjusted (FIG. 9, estimation) according to a distortion/rate-distortion metric.

In particular, for the determination of the grouping of the adaptive filters the coding efficiency may be taken into account as well (in addition to the result of the filter parameter estimation). In particular, in order to improve the coding efficiency:
- An adaptive filter may be grouped into a group in which one of its filter coefficients that is estimated to be non-zero is not in the filter shape of the filter group (in particular, filter coefficients that have a value below a certain threshold).
- An adaptive filter may be grouped into a group in which one of its filter coefficient that is estimated to be zero is in the filter shape of the group (even if a filter coefficient that is to be included into the bitstream may not be zero).

In particular, the results of the parameter estimation may be rounded (up or down) in order to improve the coding efficiency (e.g. by grouping more adaptive filters into the same filter group).

It is noted that the existence of zero coefficients maps makes filter coefficients with value "zero" more favorable (with respect to coding efficiency), which leads to a decrease of the decoding time.

In other words, filters are grouped together, which have the same (corresponding) coefficients with zero value and/or with a small value (such as a value below a certain threshold).

Subsequently, the filter grouping information 935 is encoded 951; the zero coefficients map 950, indicating N non-zero coefficients, is encoded 952; and, for each filter in the group (f1, f2 and f3), (only) N filter coefficients 955 are encoded 953 into the bitstream, e.g. by entropy encoding unit 170 by for example using variable length or fixed length coding.

The filter coefficients 955 of each filter in the group are set 960 according to zero coefficients map 950, and the reconstructed pictures 900 and 905 are filtered 970, using for each pixel the adaptive filter associated with its pixel group.

The decoder (FIG. 10) performs the following steps that do not correspond to steps described for the encoder above:

The filter grouping information 935 is parsed/inferred 1051, e.g. from bitstream 171 and optionally decoded by entropy decoding unit 204 by for example using variable length or fixed length coding.

For the filter group the zero coefficients map 950, indicating N non-zero coefficients, is parsed 1052 e.g. from bitstream 171 and optionally decoded by entropy decoding unit 204 by for example using variable length or fixed length coding.

For each filter in a filter group (f1, f2 and f3), N filter coefficients 955 are parsed 1053 e.g. from bitstream 171 and optionally decoded by entropy decoding unit 204 by for example using variable length or fixed length coding.

Reconstruct the filters f1, f2 and f3 in the group according to the zero coefficients map 945. The filter coefficients are set to zero according to the "nonzero coefficients map".

Note that this specification provides explanations for pictures (frames), but fields substitute as pictures in the case of an interlace picture signal.

Although embodiments have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

Wherever embodiments and the description refer to the term "memory", the term "memory" shall be understood and/or shall comprise a magnetic disk, an optical disc, a read-only memory (Read-Only Memory, ROM), or a random access memory (Random Access Memory, RAM), or the like, unless explicitly stated otherwise.

The person skilled in the art will understand that the "blocks" ("units") of the various figures (method and apparatus) represent or describe functionalities of embodiments (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit.

Embodiments may further comprise an apparatus, e.g. encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blu ray disc, DVD, CD, USB (flash) drive, hard disc, server storage available via a network, etc.

An embodiment comprises or is a computer program comprising program code for performing any of the methods described herein, when executed on a computer.

An embodiment comprises or is a non-transitory computer readable medium comprising a program code that, when executed by a processor, causes a computer system to perform any of the methods described herein.

LIST OF REFERENCE SIGNS

FIG. 1

| | |
|---|---|
| 100 | Encoder |
| 103 | Picture block |
| 102 | Input (e.g. input port, input interface) |
| 104 | Residual calculation |
| 105 | Residual block |
| 106 | Transformation (e.g. additionally comprising scaling) |
| 107 | Transformed coefficients |
| 108 | Quantization |
| 109 | Quantized coefficients |
| 110 | Inverse quantization |
| 111 | De-quantized coefficients |
| 112 | Inverse transformation (e.g. additionally comprising scaling) |
| 113 | Inverse transformed block |
| 114 | Reconstruction |
| 115 | Reconstructed block |
| 116 | (Line) buffer |
| 117 | Reference samples |
| 120 | Loop filter |
| 121 | Filtered block |
| 130 | Decoded picture buffer (DPB) |
| 131 | Decoded picture |
| 142 | Inter estimation (or inter picture estimation) |
| 143 | Inter estimation parameters (e.g. reference picture/reference picture index, motion vector/offset) |
| 144 | Inter prediction (or inter picture prediction) |
| 145 | Inter prediction block |
| 152 | Intra estimation (or intra picture estimation) |
| 153 | Intra prediction parameters (e.g. intra prediction mode) |
| 154 | Intra prediction (intra frame/picture prediction) |
| 155 | Intra prediction block |
| 162 | Mode selection |
| 165 | Prediction block (either inter prediction block 145 or intra prediction block 155) |
| 170 | Entropy encoding |
| 171 | Encoded picture data (e.g. bitstream) |
| 172 | Output (output port, output interface) |

FIG. 2

| | |
|---|---|
| 200 | Decoder |
| 171 | Encoded picture data (e.g. bitstream) |
| 202 | Input (port/interface) |
| 204 | Entropy decoding |
| 209 | Quantized coefficients |
| 210 | Inverse quantization |
| 211 | De-quantized coefficients |
| 212 | Inverse transformation (scaling) |
| 213 | Inverse transformed block |
| 214 | Reconstruction (unit) |
| 215 | Reconstructed block |
| 216 | (Line) buffer |
| 217 | Reference samples |
| 220 | Loop filter (in loop filter) |
| 221 | Filtered block |
| 230 | Decoded picture buffer (DPB) |
| 231 | Decoded picture |
| 232 | Output (port/interface) |
| 244 | Inter prediction (inter frame/picture prediction) |
| 245 | Inter prediction block |
| 254 | Intra prediction (intra frame/picture prediction) |
| 255 | Intra prediction block |
| 260 | Mode selection |
| 265 | Prediction block (inter prediction block 245 or intra prediction block 255) |

FIG. 3

| | |
|---|---|
| 300 | Coding system |
| 310 | Source device |
| 312 | Picture Source |
| 313 | (Raw) picture data |
| 314 | Pre-processor/Pre-processing unit |
| 315 | Pre-processed picture data |
| 318 | Communication unit/interface |
| 320 | Destination device |
| 322 | Communication unit/interface |
| 326 | Post-processor/Post-processing unit |
| 327 | Post-processed picture data |
| 328 | Display device/unit |
| 330 | transmitted/received/communicated (encoded) picture data |

FIG. 4

| | |
|---|---|
| 400 | Video coding device |
| 410 | Ingress ports |
| 420 | Receiver units (Rx) |
| 430 | Central processing unit (CPU) |
| 440 | Transmitter units |
| 450 | Egress ports |
| 460 | Memory |
| 470 | Coding module |

FIG. 5

| | |
|---|---|
| 510 | Intra/inter prediction |
| 515 | Intra/inter prediction |
| 520 | Inverse Transformation |
| 525 | Inverse Transformation |
| 530 | Reconstructed picture (output of previous encoding stages) |
| 535 | Reconstructed picture (output of previous encoding stages) |
| 540 | Filter parameter estimation |
| 545 | Filtering parameters |
| 550 | Filtering of reconstructed picture |
| 555 | Filtering of reconstructed picture |
| 560 | Entropy Encoding |
| 570 | Encoded picture Data |
| 580 | Entropy Decoding |

FIG. 6

| | |
|---|---|
| 610 | Reconstructed picture (output of previous encoding stages) |
| 620 | Pixel classifier |
| 631 | Filter parameter estimation for Filter 1 |
| 632 | Filter parameter estimation for Filter 2 |
| 633 | Filter parameter estimation for Filter 3 |
| 640 | Filter parameter coding |
| 650 | Filtering of reconstructed picture |

FIG. 7

| | |
|---|---|
| 740 | Support region |
| 741 | Scan order of support region 740 |
| 745 | Center coefficient of support region 740 |
| 750 | Zero coefficients map |
| 760 | Filter shape resulting from zero coefficients map 750, support region 740 and scan order 741 |

FIGS. 8A, 8B, 8C, and 8D

| | |
|---|---|
| 810 | Sequence of flags |
| 820 | Predefined scan order |
| 831 | Predefined scan order corresponding to scan order index "0" |
| 832 | Predefined scan order corresponding to scan order index "1" |
| 833 | Predefined scan order corresponding to scan order index "2" |
| 841 | Zero coefficients map corresponding to map index "0" |
| 842 | Zero coefficients map corresponding to map index "1" |
| 843 | Zero coefficients map corresponding to map index "2" |

FIG. 9

| | |
|---|---|
| 900 | Reconstructed picture (output of previous stages) |
| 905 | Reconstructed picture (output of previous stages) |
| 910 | Pixel classifier 900 |
| 921 | Filter parameter estimation for Filter 1 |
| 922 | Filter parameter estimation for Filter 2 |
| 923 | Filter parameter estimation for Filter 3 |
| 930 | Grouping of filters, thereby generating filter grouping information 935 |
| 935 | Filter grouping information |
| 940 | Estimation of zero coefficients map 950 |
| 950 | zero coefficients map |
| 951 | Encode filter grouping information 935 |
| 952 | Encode zero coefficients map 950 |
| 953 | Encode N filter coefficients 955 |
| 955 | N filter coefficients |
| 960 | Setting of filter coefficients |
| 970 | Filtering of Reconstructed picture 900 and 905 |

FIG. 10

| | |
|---|---|
| 1051 | Parse/infer filter grouping information 935 |
| 1052 | Parse zero coefficients map 950 |
| 1053 | Parse N filter coefficients 955 |

FIG. 11

| | |
|---|---|
| 1110 | Parse filter grouping information 1115 |
| 1115 | Filter grouping information |
| 1120 | Parse zero coefficients map 1125 |
| 1125 | Zero coefficients map |
| 1130 | Parse N filter coefficients 1135 |
| 1135 | N filter coefficients |
| 1140 | Reconstruct Filter f_A and Filter f_B |
| 1150 | Filtering of reconstructed picture 1155 |
| 1155 | Reconstructed picture |
| 1161 | Filter f_A |
| 1162 | Filter f_B |

FIG. 12

| | |
|---|---|
| 1201 | Filter f_a |
| 1202 | Filter f_b |
| 1203 | Filter f_c |
| 1210 | Signal number of zero coefficients maps |
| 1220 | Signal each zero coefficients maps |
| 1221 | Zero coefficients map corresponding to map ID "0" |
| 1222 | Zero coefficients map corresponding to map ID "1" |
| 1240 | Signal, for each adaptive filter, the corresponding zero coefficients map ID |
| 1250 | Signal, for each adaptive filter, the nonzero filter coefficients |
| 1260 | Construct the filters f_a, f_b, and f_c |

What is claimed is:

1. An apparatus for decoding picture samples from a bitstream, the apparatus comprising:
one or more processors; and
a non-transitory computer-readable medium having processor-executable instructions stored thereon, wherein the processor-executable instructions, when executed by the one or more processors, facilitate:
determining, according to the bitstream, a plurality of zero coefficients maps, wherein each of the plurality of zero coefficients maps comprises a plurality of bits, each bit indicating whether or not a respective filter coefficient is to be extracted from the bitstream for an adaptive filter of a plurality of adaptive filters;
obtaining a map identifier indicating a respective zero coefficient map, of the plurality of zero coefficient maps, to use for each of the plurality of adaptive filters; and
extracting, from the bitstream, at least one respective filter coefficient for the adaptive filter based on the respective zero coefficients map indicated by the map identifier.

2. The apparatus according to claim 1, wherein each respective coefficient indicated, by the zero coefficients map, as to be extracted from the bitstream is non-zero.

3. The apparatus according to claim 1, wherein obtaining the map identifier comprises extracting, from the bitstream, the map identifier.

4. The apparatus according to claim 1,
wherein the processor-executable instructions, when executed by the one or more processors, further facilitate:
extracting, from the bitstream, a number of zero coefficients maps of the plurality of zero coefficients maps and the plurality of zero coefficient maps, wherein the plurality of zero coefficient maps follows the number of zero coefficients maps in the bitstream, wherein the least one respective filter coefficient follows the plurality of zero coefficient maps in the bitstream.

5. The apparatus according to claim 4, wherein the processor-executable instructions, when executed by the one or more processors, further facilitate:
extracting, from the bitstream, a number of adaptive filters and the map identifier, wherein the map identifier follows the number of adaptive filters in the bitstream.

6. The apparatus according to claim 1, wherein the zero coefficients map comprises, for each bit, a corresponding flag.

7. The apparatus according to claim 1, wherein the processor-executable instructions, when executed by the one or more processors, facilitate:
extracting, from the bitstream, an indication of the plurality of zero coefficients maps, wherein the indication comprises a positive integer N indicating that (i) the first N filter coefficients in a sequence indicated by a predefined filter coefficient scan order are to be extracted from the bitstream, and (ii) the remaining filter coefficients in the sequence are not to be extracted from the bitstream.

8. The apparatus according to claim 7, wherein the indication further comprises a syntax element indicating which predefined filter coefficient scan order of a plurality of predefined filter coefficient scan orders is the predefined filter coefficient scan order.

9. The apparatus according to claim 1, wherein the processor-executable instructions, when executed by the one or more processors, further facilitate:
determining a group of a picture sample, the group comprising all picture samples to be filtered with the adaptive filter, based on evaluating the picture sample for at least one of:
a position in a picture frame,
an activity metric that measures variation in a local sample value,
local edge information,
an intensity value, or
a number of neighboring samples that are smaller than the sample to be filtered.

10. The apparatus according to claim 9, wherein the processor-executable instructions, when executed by the one or more processors, further facilitate:

filtering the picture sample using the adaptive filter with the at least one filter coefficient extracted from the bitstream.

11. The apparatus according to claim 1, wherein the processor-executable instructions, when executed by the one or more processors, further facilitate:
extracting, from the bitstream, for a group of picture samples, an indication of the adaptive filter to be used to filter the pictures samples in the group.

12. The apparatus according to claim 1, wherein the processor-executable instructions, when executed by the one or more processors, further facilitate:
determining, according to the bitstream, a scan order associated with the zero coefficient map; and
reconstructing the adaptive filter based on the at least one respective filter coefficient and the scan order.

13. The apparatus according to claim 12, wherein determining the scan order comprises:
extracting, from the bitstream, a plurality of scan orders for the plurality of zero coefficient maps;
extracting, from the bitstream, an index indicating the scan order to use for the zero coefficient map; and
determining the scan order for the zero coefficient map based on the index and the plurality of scan orders.

14. An apparatus for encoding picture samples into a bitstream, the apparatus comprising:
one or more processors; and
a non-transitory computer-readable medium having processor-executable instructions stored thereon, wherein the processor-executable instructions, when executed by the one or more processors, facilitate:
determining a plurality of zero coefficients maps comprising a plurality of bits, wherein each bit indicates whether or not a respective filter coefficient is to be included into the bitstream for an adaptive filter of a plurality of adaptive filters;
determining a map identifier indicating a respective zero coefficient map, of the plurality of zero coefficient maps, to use for each of the plurality of adaptive filters; and
including, into the bitstream, the plurality of zero coefficients maps, the map identifier, and at least one filter coefficient of the adaptive filter indicated by the zero coefficients map as to be included into the bitstream, wherein the map identifier follows the plurality of zero coefficient maps in the bitstream and the at least one filter coefficient follows the map identifier in the bitstream.

15. A method for decoding picture samples from a bitstream, the method comprising:
determining, by processing circuitry and according to the bitstream, a plurality of zero coefficients maps, wherein each of the plurality of zero coefficients maps comprises a plurality of bits, each bit indicating whether or not a respective filter coefficient is to be extracted from the bitstream for an adaptive filter of a plurality of adaptive filters;
obtaining, by the processing circuitry, a map identifier indicating a respective zero coefficient map, of the plurality of zero coefficient maps, to use for each of the plurality of adaptive filters; and
extracting, by the processing circuitry, from the bitstream, at least one filter coefficient for the adaptive filter based on the zero coefficients map indicated by the map identifier.

16. A method for encoding picture samples into a bitstream, the method comprising:
determining, by processing circuitry, a plurality of zero coefficients maps comprising a plurality of bits, each bit indicating whether or not a respective filter coefficient is to be included into the bitstream for an adaptive filter of a plurality of adaptive filters;
determining, by the processing circuitry, a map identifier indicating a respective zero coefficient map, of the plurality of zero coefficient maps, to use for each of the plurality of adaptive filters; and
including, by the processing circuitry and into the bitstream, the plurality of zero coefficients maps, the map identifier, and at least one filter coefficient of the adaptive filter indicated by the zero coefficients map as to be included into the bitstream, wherein the map identifier follows the plurality of zero coefficient maps in the bitstream and the at least one filter coefficient follows the map identifier in the bitstream.

* * * * *